(12) United States Patent
Barnawi

(10) Patent No.: US 11,594,141 B1
(45) Date of Patent: Feb. 28, 2023

(54) SYSTEM AND METHODS TO NEUTRALIZE AN ATTACKING UAV BASED ON ACOUSTIC FEATURES

(71) Applicant: King Abdulaziz University, Jeddah (SA)

(72) Inventor: Ahmed Barnawi, Jeddah (SA)

(73) Assignee: King Abdulaziz University, Jeddah (SA)

(\*) Notice: Subject to any disclaimer, the term of this patent is extended or adjusted under 35 U.S.C. 154(b) by 0 days.

(21) Appl. No.: 17/579,159

(22) Filed: Jan. 19, 2022

(51) Int. Cl.
*G08G 5/00* (2006.01)
*G01S 13/58* (2006.01)

(52) U.S. Cl.
CPC .......... *G08G 5/0082* (2013.01); *G01S 13/589* (2013.01); *G08G 5/003* (2013.01); *G08G 5/006* (2013.01)

(58) Field of Classification Search
CPC ...... G08G 5/0082; G08G 5/003; G08G 5/006; G01S 13/589; F41H 11/02
See application file for complete search history.

(56) References Cited

U.S. PATENT DOCUMENTS

| | | | | |
|---|---|---|---|---|
| 10,866,597 B1* | 12/2020 | Reinhold | ................. | G05D 1/12 |
| 11,022,407 B2* | 6/2021 | Whitmarsh | .......... | G08G 5/0069 |
| 11,073,362 B1* | 7/2021 | Barnawi | ................ | G06N 20/00 |
| 2004/0075605 A1* | 4/2004 | Bradford | ............... | G01S 13/878 |
| | | | | 342/96 |
| 2013/0329052 A1 | 12/2013 | Chew | | |
| 2017/0261999 A1* | 9/2017 | Van Voorst | .......... | G08G 5/0082 |
| 2020/0108924 A1 | 4/2020 | Smith et al. | | |

FOREIGN PATENT DOCUMENTS

RU        2 700 107 C1       9/2019

OTHER PUBLICATIONS

Al-Emadi, et al.; Audio-Based Drone Detection and Identification Using Deep Learning Techniques with Dataset Enhancement through Generative Adversarial Networks; *Sensors 2021*, 21; Jul. 21, 2021; 26 Pages.

Squarehead Technology; Squarehead unveils Discovair G2—Precision Acoustic Detection; https://www.sqhead.com/squarehead-unveils-discovair-g2/; Aug. 3, 2018; 4 Pages.

\* cited by examiner

*Primary Examiner* — Shon G Foley
(74) *Attorney, Agent, or Firm* — Oblon, McClelland, Maier & Neustadt, L.L.P.

(57) ABSTRACT

A distributed airborne acoustic anti-drone intelligence system (DAAADS) which senses an unmanned aerial vehicle (UAV) approaching a protected site, predicts trajectories of the UAV which intersect the protected site and identifies the type of the UAV. When at least one of the trajectories intersect the protected site, an alarm and predicted trajectories are transmitted to an air defense unit, which neutralizes the UAV. Debris generated by the neutralization is tracked and trajectories of the debris are predicted. When a trajectory of the debris is predicted to intersect with the protected site, an alert is transmitted to the protected site.

20 Claims, 22 Drawing Sheets

SYSTEM AND METHODS TO NEUTRALIZE AN ATTACKING UAV BASED ON ACOUSTIC FEATURES

CROSS REFERENCE TO RELATED APPLICATIONS

The present application is related to U.S. application Ser. No. 17/398,067, entitled "Blimp-Based Aerial UAV Defense System" filed on Aug. 10, 2021, which is pending; U.S. application Ser. No. 17/234,852, entitled "Blimp Deployed Anti-Drone System", filed on Apr. 20, 2021, now U.S. Pat. No. 11,118,870, which is a continuation of U.S. application Ser. No. 17/001,071 entitled "Distributed Airborne Acoustic Anti Drone System (DAAADS)", filed on Aug. 24, 2020, now U.S. Pat. No. 11,073,362, each incorporated herein by reference in their entirety.

STATEMENT OF ACKNOWLEDGEMENT

The inventors acknowledge the financial support provided by the Deputyship for Research & Innovation, Ministry of Education in Saudi Arabia through project number 2021-132 and by King Abdulaziz University, DSR, Jeddah, Saudi Arabia.

BACKGROUND

Technical Field

The present disclosure is directed to systems and methods for tracking the trajectories of unmanned aerial vehicles approaching a protected site, alerting an air defense unit of the attacking unmanned aerial vehicles and tracking debris trajectories of objects originating from the disintegration of the unmanned aerial vehicles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In September 2019, Unmanned Aerial Vehicles (UAVs), also known as "drones", were used to carry out a terrorist attack on a Saudi Aramco oil field processing facility, the largest processing facility in the world at the time. As the cost of commercially available drones continues to decrease and as their popularity continues to increase, high priority has been given to detecting and defending against the use of UAVs to conduct malicious/hostile activities. This is especially true for law enforcement agencies. As a UAV can go almost undetected using conventional optical or electromagnetic sensing techniques, there is great need for innovation in proactively detecting hostile UAVs and intercepting the trajectory of an attacking UAV in a cost-effective manner that reduces collateral damage to the surrounding environment.

Some systems currently available for drone detection utilize a variety of sensors, such as radio frequency (RF) sensors and/or ultrasonic sensors, and closed-circuit television (CCTV) cameras to detect drone activity. DRONEDNA, offered by Dedrone of Dallas, Tex., is one specific example of such a system. However, DRONEDNA and other similar systems suffer from poor night vision, a limited area of coverage, and slow response time. Other systems for detecting UAVs currently available, such as SKYLOCK, offered by the Avnon Group of Petah Tikva, Israel, provide a multi-layered platform of modular systems for the detection, verification, and neutralization of unauthorized UAVs through a combination of passive and active systems including RF and/or infrared (IR) radar systems. However, SKYLOCK and similar systems face limitations based on the signals being emitted by a suspected unauthorized UAV, the materials of which the UAV is made, and lack of full automation. SKYLOCK and similar systems also suffer from a limited range of coverage.

When systems like DRONEDNA/SKYLOCK detect an approaching drone, a determination is made as to whether the approaching drone has authorization to be in the air space and an assessment is made as to the threat level of the approaching drone. If the approaching drone is not authorized to be in the air space and/or is deemed to be a sufficient threat, efforts are made to engage, divert, destroy and/or neutralize the approaching drone.

Destroying a UAV entails using sufficient physical force to inflict mechanical damage to the drone. While commercially available drones such as the PHANTOM 4 PRO, offered by DJI of Shenzhen, China are easily destructible, military-grade UAVs are not. In fact, destroying a military-grade UAV may necessitate the use of military-grade defense systems, such as Patriot and/or Hawk missile systems, which are extremely expensive and are prone to damaging the surrounding environment.

RU2700107C1 describes an anti-drone combat system including a mobile platform having grenade launchers for protecting against attacking drones. However, no mention of tracking the debris of the destroyed drone is made. The debris generated by destroying a drone may cause as much damage as the attacking drone itself if the debris trajectory intersects the protected site.

Accordingly, it is an object of the present disclosure to provide methods and systems for identifying trajectories of an attacking UAV, alerting an air defense unit to engage, divert, destroy and/or neutralize the attacking UAV, tracking the debris from the neutralized UAV, predicting paths toward the protected site which the approaching debris may traverse, and alerting the protected site of the predicted path(s) of the approaching debris.

SUMMARY

Aspects of the present disclosure describe a distributed airborne acoustic anti-drone intelligence system (DAAADS) which senses an unmanned aerial vehicle (UAV) approaching a protected site, predicts trajectories of the UAV which intersect the protected site and identifies the type of the UAV. When at least one of the trajectories intersect the protected site, an alarm and predicted trajectories are transmitted to an air defense unit, which neutralizes the UAV.

Debris generated by the neutralization is tracked and trajectories of the debris are predicted. When a trajectory of the debris is predicted to intersect with the protected site, an alert is transmitted to the protected site.

The sensing is performed by a plurality of airborne defense agents (ADAs), each ADA including an air balloon which is tethered to a tower. Each ADA includes a directional microphone array and electronics for acoustically sensing sound waves emanating from a UAV or debris generated by neutralizing a UAV.

In an exemplary embodiment, a distributed airborne acoustic anti-drone intelligence system is described, comprising a plurality of airborne defense agents (ADAs), wherein each ADA is located at a fixed radius from a protected site and equidistant from each other ADA, wherein each ADA is equipped with a directional microphone array configured to detect acoustic signals emitted by a unmanned aerial vehicle (UAV) approaching the protected site; a first computing device including a first computer-readable medium comprising first program instructions, executable by a first processing circuitry, to cause the first processing circuitry to determine an angle of approach and a distance of approaching UAV from the ADA; a GPS receiver configured to locate the ADA in three-dimensional space; a first transceiver; a fixed tower of height H, the fixed tower located at a fixed radius from the protected site and equidistant from each other tower; a tether, each tether of length L, wherein a top portion of the fixed tower is connected to a first end of the tether; an air balloon having a lower mount attached to a second end of the tether, wherein each air balloon is configured to hold the first computing device and the directional microphone array of the ADA at a fixed height L+H above the ground and is further configured to hover at a position above the fixed tower; a base station configured with a wideband communications link to communicate with the first transceiver of each ADA, the protected site and an air defense unit; a control center (BS-CC) located within the base station and configured with a second computing device including a second computer-readable medium comprising program instructions, executable by second processing circuitry, to cause the second processing circuitry to calculate the speed of each of the approaching UAVs, aggregate the angles of approach, the distances and the speeds of the each of the approaching UAVs, predict trajectories of each of the approaching UAVs towards the protected site, identify each UAV having a trajectory predicted to intersect the protected site, alert the protected site of the predicted trajectories of each UAV having a trajectory predicted to intersect the protected site, transmit the predicted trajectories to the air defense unit with a command to neutralize each attacking UAV, transmit a command to the plurality of ADAs to track particles of debris generated by neutralizing the attacking UAV, receive distances and angles of approach of each particle of debris, calculate the speed of each particle of debris, estimate trajectories of each of the particles of debris, predict whether at least one trajectory of the particles of debris will intersect the protected site; and transmit an alert to the protected site that the at least one trajectory of the particles of debris is predicted to intersect the protected site.

In another exemplary embodiment, a method for detecting trajectories of unmanned aerial vehicles (UAV) approaching a protected site is described, comprising switching each directional microphone of a directional microphone array of a plurality of airborne defense agents (ADAs) ON and OFF during consecutive time periods in which only one directional microphone is ON in a time period, wherein each ADA is located at a fixed radius from the protected site and equidistant from each other ADA, wherein each ADA is located on an air balloon held by a tether to a fixed tower; detecting acoustic signals generated by each UAV approaching the protected site during consecutive ON periods; estimating, by a first computing device of at least one of the ADAs, an angle of approach and a distance of each UAV approaching the protected site from the at least one ADA during the first time period of the consecutive time periods, wherein the first computing device includes a first computer-readable medium having first program instructions, that, when executed by the first processing circuitry, cause the first processing circuitry to estimate the angle of approach and the distance of each approaching UAV from the at least one ADA; estimating the angle of approach and the distance of each approaching UAV from the at least one ADA during a second time period of the consecutive time periods; transmitting the estimated angles of approach and the estimated distances from each ADA to a base station; estimating, by a second computing device including a second computer-readable medium comprising program instructions, executable by a second processing circuitry located in a control center of the base station, a speed of each UAV by subtracting the distance estimated during a first ON time period from the distance estimated during a second ON time period for each of three equidistant ADAs and dividing by the difference between the first and second time periods; aggregating, by the second computing device, the angles of approach, distances and speeds of the approaching UAVs; predicting, by the second computing device, trajectories of each approaching UAV; transmitting, by the base station, an alarm to an air defense unit when at least one of the trajectories of at least one approaching UAV is predicted to intersect with the protected site; neutralizing, by the air defense unit, the approaching UAV which has a trajectory which intersects with the protected site, thus generating particles of debris; tracking, by the directional microphone of at least one ADA, the angle of approach and the distance of each of the particles of debris; transmitting the angle of approach and the distance of each of the particles of debris to the control center; estimating, by the control center, the speed of each of the particles of debris, estimating, by the control center, trajectories of each of the particles of debris; predicting, by the control center, whether at least one trajectory of the particles of debris will intersect the protected site; and transmitting an alert to the protected site that the at least one trajectory of the particles of debris is predicted to intersect the protected site.

In another exemplary embodiment, a non-transitory computer readable medium having program instructions stored therein that, when executed by one or more processors, cause the one or more processors to perform a method for detecting trajectories of unmanned aerial vehicles (UAV) approaching a protected site is describes, comprising receiving an angle of approach and distance of each unmanned aerial vehicle (UAV) approaching the protected site, wherein each angle of approach and distance was estimated by a plurality of airborne defense agents (ADAs) surrounding the protected site, wherein each ADA is located at a fixed radius from the protected site and equidistant from each other ADA, wherein each ADA is located on an air balloon held by a tether to a fixed tower, and is configured to detect acoustic signals generated by each UAV approaching the protected site during consecutive ON periods; estimating a speed of each UAV by subtracting the distance estimated by a directional microphone array of each ADA of three equidistant ADAs during a first ON time period from the distance estimated during a second ON time period and dividing by the difference between the first and second time periods; aggregating the angles of approach, distances and speeds of each of the approaching UAVs; predicting trajectories of each UAV towards the protected site; transmitting an alarm to an air defense unit when at least one of the trajectories of at least one UAV is predicted to intersect with the protected site; neutralizing, by the air defense unit, the UAV which has a trajectory which intersects with the protected site, thus generating particles of debris; detecting, by at least one of the ADAs, acoustic signals generated by the particles of debris; calculating an angle of approach, a distance and a speed of each of the particles of debris; estimating trajectories of each of the particles of debris; predicting whether at least one trajectory of the particles of debris will intersect the protected site; and transmitting an alert to the protected site that a trajectory of a particle of debris is predicted to intersect the protected site.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
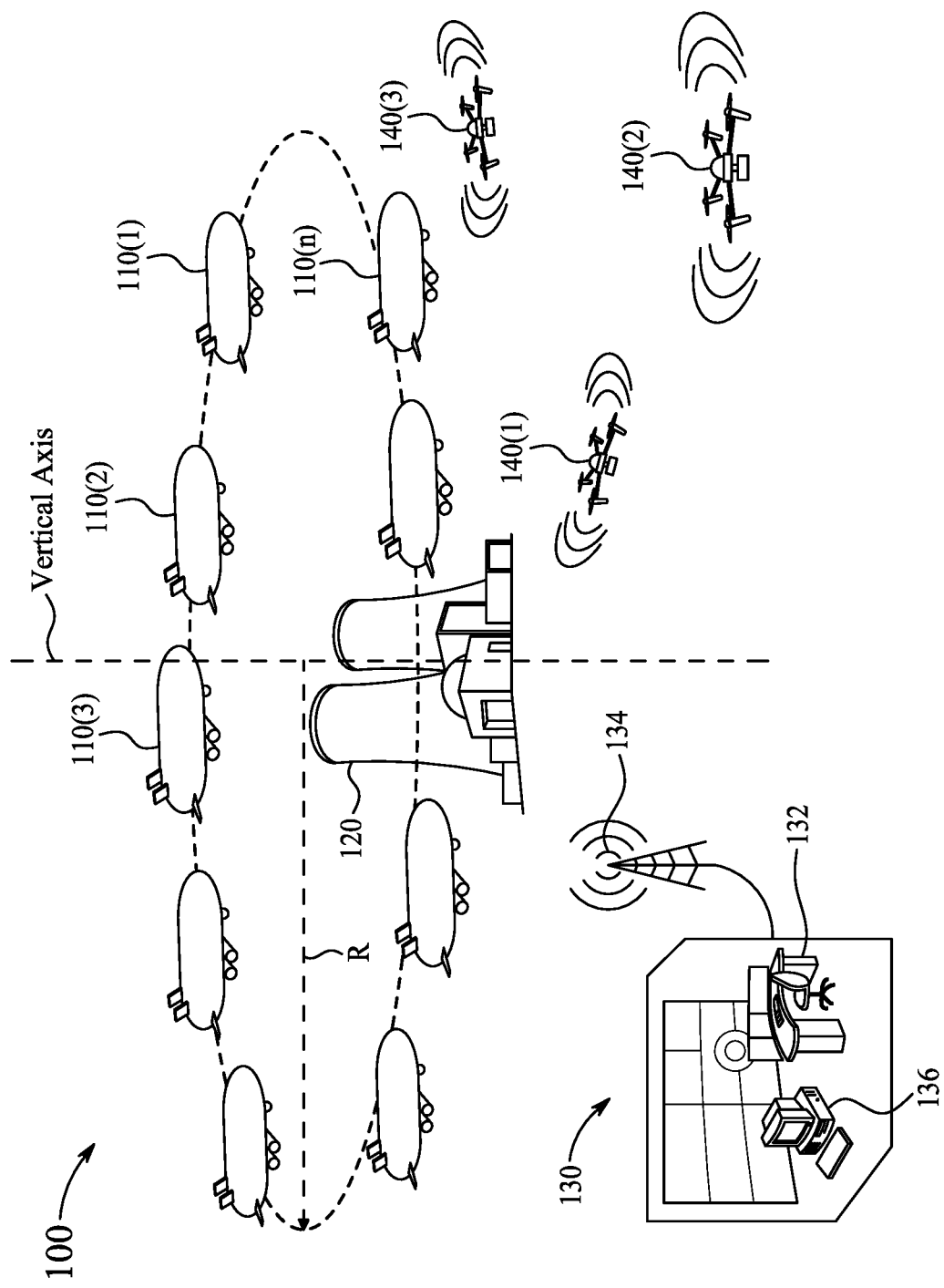
FIG. 1 is an illustration of a distributed airborne acoustic anti-drone intelligence system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or 5%, and any values therebetween.

The present disclosure addresses the problem of debris from a neutralized unmanned aerial vehicle (UAV) approaching a protected site on a course for intersecting with the protected site. The debris from a damaged or disintegrated drone has the potential to cause as much damage as the attacking UAV. In an overview, the present disclosure describes (i) predicting the trajectory(ies) of an incoming drone relative to a protected site, (ii) transmitting an alarm to an air defense unit identifying the trajectories, then (iii) tracking and predicting the path of debris generated by intercepting the incoming drone in relation to the protected site after the air defense unit has engaged the incoming UAV.

Aspects of the present disclosure are directed to a system, device, and method for a distributed airborne acoustic anti-drone intelligence system (DAAADS) which is a fully automated, dynamic, scalable, remote, intelligent, and long-range distributed system for detecting trajectories of an unauthorized, potentially malicious/hostile UAV approaching a protected site. By utilizing (e.g., sensing) acoustic signals and generating a reliable stream of data from those signals, the DAAADS is able to predict trajectories of a UAV which may intersect the protected site. In some examples, "generating a reliable stream of intelligence" may include using sensed acoustic data to calculate a speed/angle of approach of a detected UAV, and predicting possible trajectories of the detected UAV based on the calculated speed/angle of approach. Predicting possible trajectories of the detected, approaching UAV may be performed by circuitry included in the ADAs comprising the DAAADS, the base station, a control center (BS-CC) located in the protected zone, or in any combination thereof. Based on the trajectories, the DAAADS identifies the type of the approaching UAV and predicts whether the approaching UAV is an attacker. When the UAV is identified as an attacker, the DAAADS notifies an air defense unit of the current coordinates, the predicted trajectories and the type of UAV. After the air defense unit has neutralized the UAV, the DAAADS tracks the debris, predicts trajectories of the debris and alerts the protected site when the debris trajectories are predicted to intersect with the protected zone.

Aspects of the present disclosure relate to a distributed airborne acoustic anti-drone intelligence system (DAAADS) in communication with the air defense unit. The DAAADS includes a base station configured with a wideband communications link to communicate with a first transceiver of each of a plurality of airborne defense agents (ADAs), a second transceiver of the protected site, and with the air defense unit. Each ADA may include a first transceiver and a first computing device including a first computer-readable medium comprising first program instructions, executable by first processing circuitry, to cause the first processing circuitry to detect incoming UAVs, their angles of approach, and distances from the ADA, and communicate the angles of approach and distances to a control center (BS-CC) located within the base station. The BS-CC is configured with a second computing device including a second computer-readable medium comprising second program instructions, executable by second processing circuitry, to cause the second processing circuitry to calculate the speed of each approaching UAV, aggregate the speeds, directions and distances of the approaching UAVs to predict trajectories of the UAVs which intersect the protected site, transmit an alarm to the air defense unit of the UAVs having trajectories which intersect the protected site; predict debris trajectories of each UAV neutralized by the air defense unit, and alert the protected site of the predicted debris trajectories when at least one trajectory is predicted to intersect the protected site. The second computing device includes a regression algorithm to predict the trajectories of the UAVs and the trajectories of the debris from the neutralized UAVs after neutralization. The second computing device may include one or more of a deep learning algorithm and a reinforcement learning algorithm to identify the type of attacking UAV and the debris.

FIG. 1 depicts the distributed airborne acoustic anti-drone intelligence system (DAAADS) 100 for detecting trajectories of unmanned aerial vehicles (UAVs) approaching a protected site in accordance with embodiments of the present disclosure. Airborne Defense Agents 110(1), 110(2), 110(3), . . . , 110(n) (collectively, "the ADAs 110") are shown surrounding a protected site 120. Included in the protected site 120 is a base station 130 having a control center (a BS-CC) 132 that is in communication with the ADAs 110 through a wideband communications link 134. Communications between the ADAs 110 and the BS-CC 132 may be enabled via any number of wireless communications protocols including, but not limited to Bluetooth, WiFi, 2G/3G/4G/LTE/5G, ZigBee, NFC, RFID, and all variants thereof. Also depicted in FIG. 1 are UAVs 140(1), 140(2), and 140(3) (collectively "the UAVs 140"). The UAVs 140 are unmanned aerial vehicles (drones) approaching the protected site 120. In various embodiments, the UAVs 140 lack authorization to be in the protected site 120 and/or may be hostile UAVs having malicious intent.

Each of the ADAs 110 is located at a fixed radius, R, from protected site 120 and equidistant from each other ADA of the ADAs 110. The radius, R, may be perpendicular to a vertical axis of the protected site, 120. Each of the ADAs 110 is equipped with a microphone array (shown in FIG. 3) configured to detect acoustic signals emitted by a UAV.

The radius, R, is preferably at least several kilometers distance from the protected site to allow for the mitigation measures to take place with minimum collateral damage. The radius, R, is dependent on the specifications of the air defense unit, such as distance a projectile can reach, angular placement, and the like.

Included in each of the ADAs 110 is the first computing device (also shown in FIG. 3) including a first computer-readable medium comprising first programming instructions executable by a first processing circuitry. Responsive to execution of the first programming instructions, the first processing circuitry determines a direction and a distance of each of the UAVs 140 from each of the ADAs 110. In various embodiments, the first computing device includes switching circuitry configured to switch the power of each directional microphone ON and OFF in an alternating sequence. In accordance with the present disclosure, each directional microphone of the directional microphone array may be oriented to receive acoustic signals from a different angle. Moreover, each first computing device may include first circuitry configured to measure an amplitude, A, of each acoustic signal during the alternating ON periods.

Each first processing circuitry of the ADAs 110 may be further configured to detect an angle of arrival, ω, of the acoustic signal from the angle of the directional microphone receiving the greatest amplitude. Each first processing circuitry of the ADAs 110 can then estimate the distance between each of the ADAs 110 and each of the UAVs 140 by measuring a propagation delay, τ, of the acoustic signal having the greatest amplitude. Moreover, the first processing circuitry may be configured to convert the acoustic signals from the time domain to the frequency domain, identify a set of frequency components, and estimate the distance to the sound source.

Figure 3:
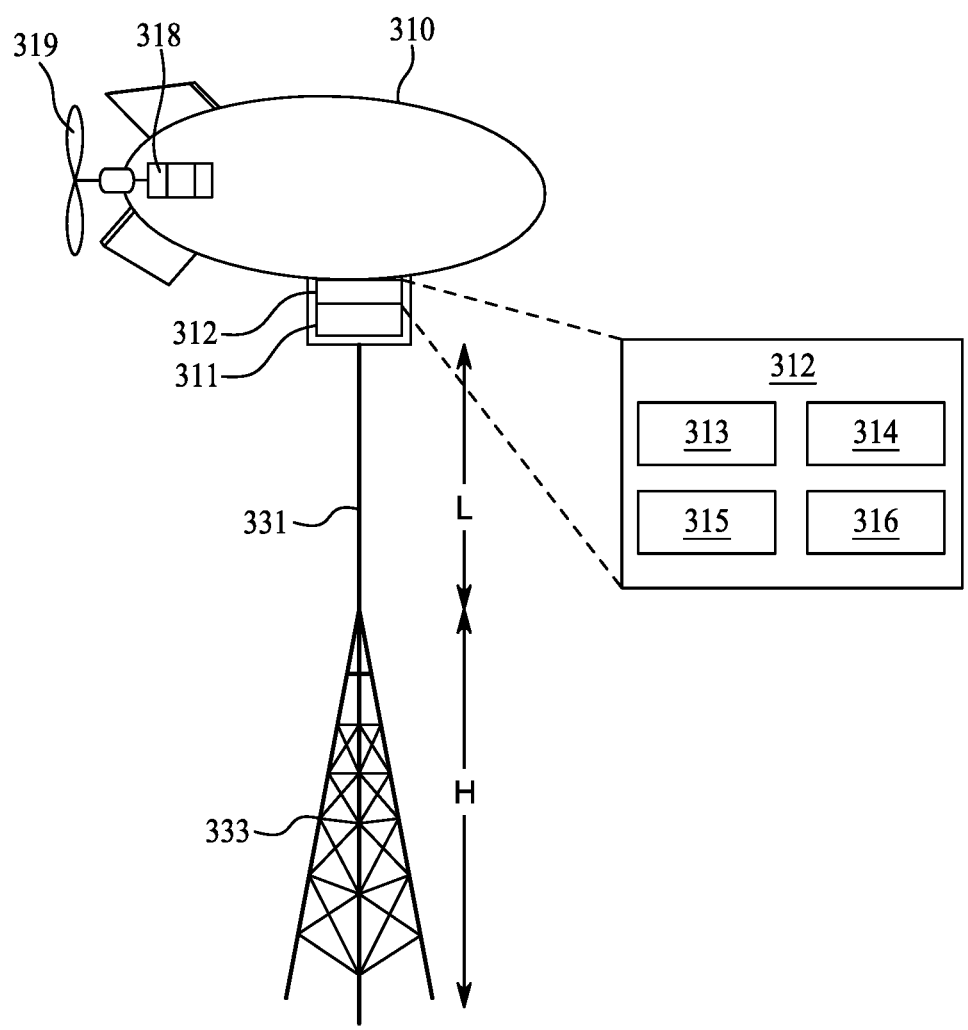
FIG. 3 illustrates an airborne defense agent tethered to a tower, according to certain embodiments.

Each of the ADAs 110 may also include GPS receiver circuitry (314, shown in FIG. 3) along with (wireless) first transceiver circuitry (315, FIG. 3). The GPS receiver circuitry can be configured to locate the respective ADA of the ADAs 110 in a three-dimensional space. Each of the ADAs 110 may further include a motor, a propeller, and navigation circuitry (318, 319, 316, FIG. 3) configured to cause a respective ADA of the ADAs 110 (also referred to as 310, FIG. 3) to hover at a fixed height from the ground, at a fixed radius from the protected site, and equidistant from each other ADA of the ADAs 110.

The DAAADS 100 further includes a BS-CC 132 configured with a wideband communications link 134 to communicate with the first transceiver of each of the ADAs 110 and protected site 120. In embodiments, the BS-CC 132 may be configured to transmit position signals to the navigation circuitry included in each of the ADAs 110 to control the position of a respective ADA of the ADAs 110. The BS-CC 132 may be further configured via a second computing device 136 including a second computer-readable medium comprising second program instructions, executable by second processing circuitry, to cause the second processing circuitry to calculate the speeds of each UAV, aggregate the speeds, directions and distances of approaching UAVs 140 to predict trajectories towards the protected site and to alert the protected site of the predicted trajectory of each of the UAVs 140 while approaching protected site 120. The second computing device 136 may identify a UAV 140 as an attacker of the protected site 120, and transmit an alert to an air defense unit (280, FIG. 2) to neutralize the attacking UAV 140. The second computing device 136 may be a personal computing device, a laptop, a mainframe, a server, a database, or any combination thereof.

In accordance with the present disclosure, the second processing circuitry of the BS-CC 132 may be configurable to transmit control signals to each of the ADAs 110 to switch the directional microphone arrays included therein ON and OFF simultaneously. Moreover, the second processing circuitry may be further configurable to predict the trajectory of a respective UAV of the approaching UAVs 140 by triangulating the acoustic signals received by the directional microphone arrays of three equidistant ADAs of the ADAs 110. Further, the second processing circuitry may also include a machine learning processor configured to predict the trajectory of each of the approaching AAs 140 toward protected site 120. The second processing circuitry may also be configured to estimate the speed of each of the UAVs 140 by subtracting the distances estimated by each of the three equidistant ADAs of the ADAs 110 at a first ON period from the distances estimated at a second ON period and dividing the difference by the time between the first ON period and the second ON period. The second processing circuitry may also be configured with a regression algorithm to track the debris from a neutralized UAV and alert the protected site when a predicted trajectory of the debris intersects the protected site.

Figure 2A:
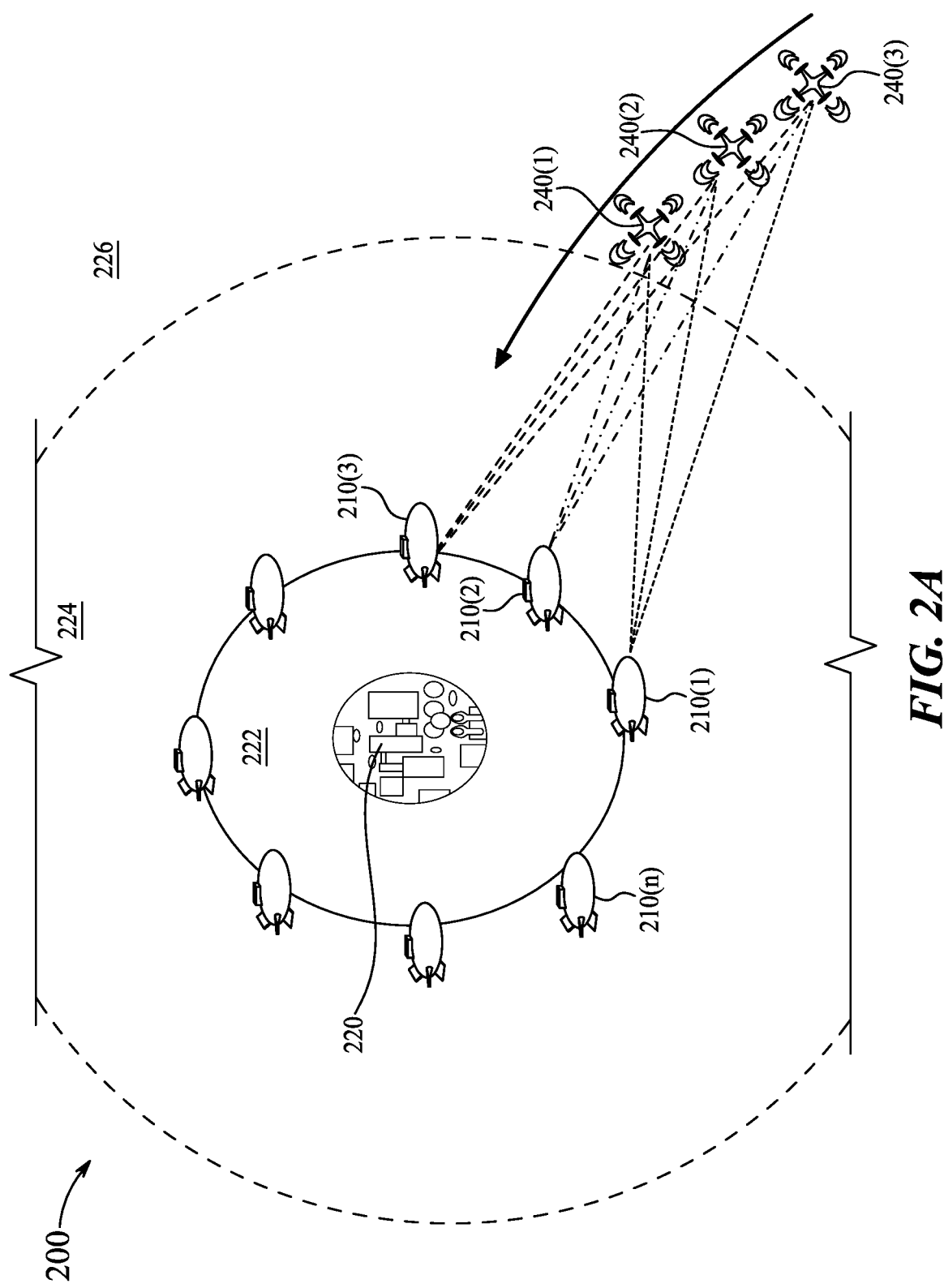
FIG. 2A is an illustration of a distributed airborne acoustic anti-drone intelligence system surrounding a protected site, according to certain embodiments.

FIG. 2A illustrates the taxonomy of a protected region 200, a region which may be protected by a DAAADS substantially similar/identical to DAAADS 100. Included in protected region 200 is protected site 220. Protected site 220 may be substantially similar/identical to protected site 120 described above. Protected region 200 also includes a demilitarized zone (DMZ) 222, a detection/reaction (D/R) zone 224, and a sensing zone 226. Airborne defense agents 210(1), 210(2), 210(3), ..., 210(n) (collectively "the ADAs 210") surround the perimeter of the DMZ 222 within the D/R zone 224, and detect approaching attacking UAVs 240(1), 240(2), and 240(3) (collectively "the UAVs 240") in the sensing zone 226.

Included in protected site 220 are a variety of communications facilities, synchronization facilities, and computation facilities and a base station (which may be substantially similar/identical to base station 130), wherein the base station is communicably coupled to computer resources in a control center, (also referred to as base station control center (BS-CC, which may be substantially similar/identical to BS-CC 132). The BS-CC is programmable to communicate with the various communications facilities, synchronization facilities, and/or computation facilities throughout the protected site 220 and the ADAs 210 to aggregate data regarding the UAVs 240 approaching protected site 220. Communications between the BS-CC and the facilities/the ADAS 210 may be enabled via a variety of wireless communications protocols including Bluetooth, WiFi, 2G/3G/4G/LTE/5G, ZigBee, NFC, RFID, and all variants thereof. The aggregated data may correspond to the directionality and distance of an approaching UAV of the UAVs 240 from protected site 220. The aggregated data may be used calculate the speed of the UAVs 240 and/or to predict a trajectory/trajectory of a respective UAV of the UAVs 240 on approach. A threat level of approaching UAVs 240 may be assessed based on these calculations. Based on the assessed threat level, alarms may be sounded throughout protected site 220 and an alert may be sent to an air defense unit 280.

The coordinates of each individual ADA of the ADAs 210 are known, and each individual ADA is used to sense a specific area. In some embodiments, the ADAs 210 may be air balloons tethered above fixed towers. The height of the directional array and electronics from the ground level is selected from the range of 40 m to 1 km. A deviation from the vertical of the air balloon may be in the range of 15 degrees to 20 degrees as long as the cartesian localization of the directional array and electronics are unambiguous. In other aspects, the ADAs 210 may be blimps, helicopters, drones, or any other type of aircraft able to hover in or otherwise maintain a relatively steady position. Each ADA may include a directional microphone array and/or an electronically driven loop forming directional microphone system configured to sense acoustic signals emitted from UAVs (e.g., UAVs 240) approaching protected site 220. Each ADA may also include a variety of other sensors/circuitry, such as a camera, a frequency analyzer, a power meter, timers, and GPS/navigational circuitry configured to measure/aggregate data related to the speed/position (e.g., distance from) relative to protected site 220. Each ADA may also include computational circuitry (first computing device) configured to calculate the speed and/or position of an approaching UAV and estimate trajectories of the approaching UAV therefrom. The computational circuitry of each ADA is also configured to track the speed and position of debris from a neutralized UAV. The trajectories may be estimated using any machine learning algorithm including, but not limited to, supervised/unsupervised/semi-supervised learning algorithms, regression based algorithms, clustering algorithms, Bayesian algorithms, decision tree algorithms, regularization algorithms, instance-based algorithms, association rule learning algorithms, artificial neural network algorithms, deep learning algorithms, or any combination thereof.

Figure 2B:
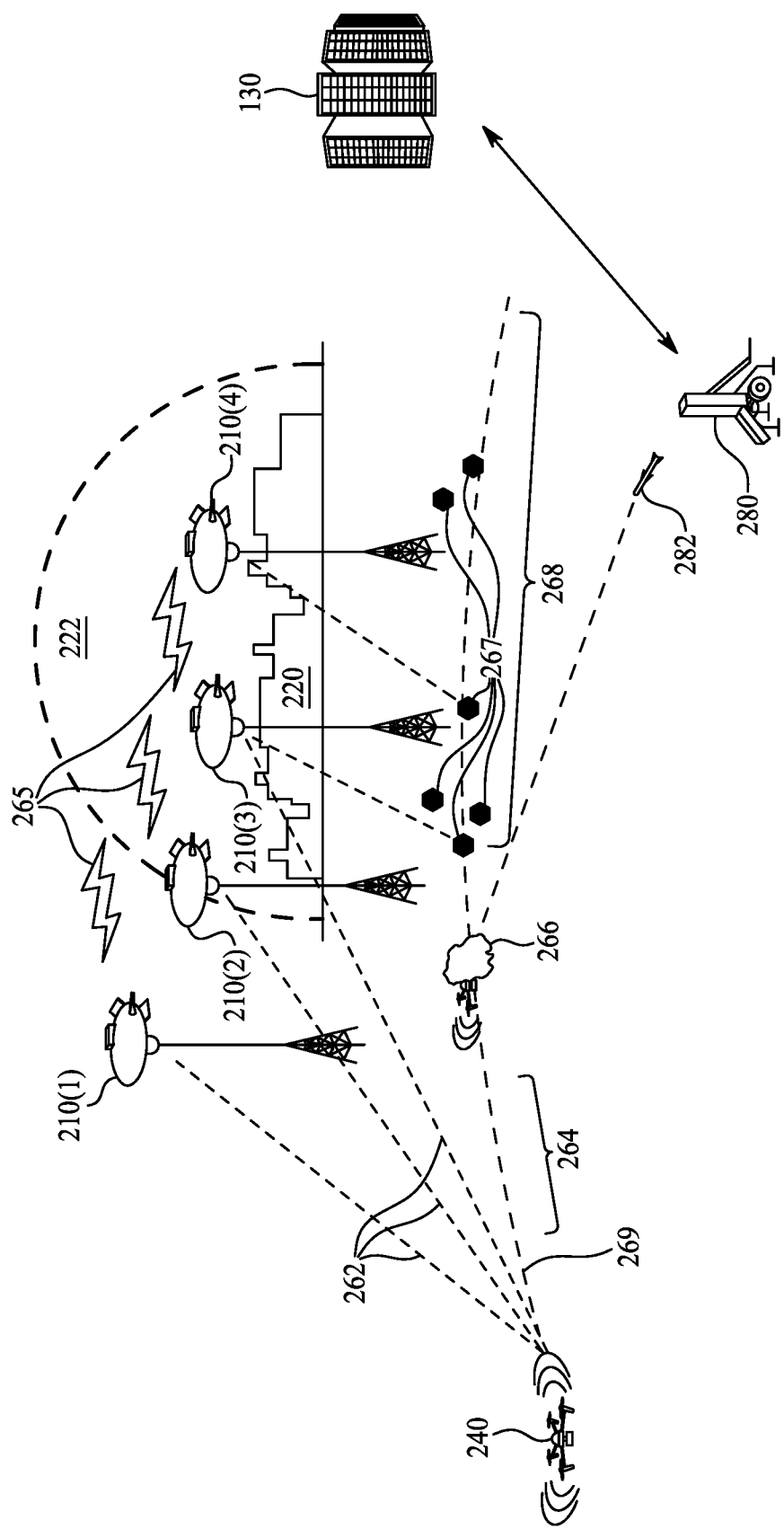
FIG. 2B is an illustration of a distributed airborne acoustic anti-drone intelligence system tracking debris of a neutralized UAV, according to certain embodiments.

Referring to FIG. 2B, the second computing system 136 may include a database of acoustic signatures of UAVs, which can be matched to the given acoustic signature of the attacking UAV to identify the type of UAV, such as the size, wing-type, and performance capabilities of the attacking UAV. The identification information is transmitted to the air defense unit 280, which uses the information to determine the countermeasure needed to neutralize the attacking UAV. The air defense unit 280 may neutralize the attacking UAV by propelling a projectile 282, such as a missile, a grenade, a bullet, a combustible fluid, a drone and the like, which is designed to impact the attacking UAV. There may be a plurality of air defense units within the protected zone. The air defense units per se are not necessarily part of the DAAADS system, but may be a contracted service or a military defense system which is operatively in communication with the DAAADS system. Once the air defense units have neutralized the attacking UAV, the DAAADS system tracks the debris and predicts trajectories of the debris which may intersect with the protected site. Each air defense unit 280 may include a ground level radar sensor, which can aid in aiming the projectile at the attacking UAV.

In some aspects of the present disclosure, and as is covered in greater detail in the ensuing discussion of FIG. 3, each of the ADAs 310 may be hovering in a fixed position. To fix the ADAs 310 in place, each ADA may be tethered (e.g., preferably by via a rope 331, chain or cable or electronically with techniques like geofencing) to a communications tower 333 or other structure configurable to facilitate wireless communications. The distance between the towers depends on the microphone array sensing range. In a non-limiting example, the distance between the towers should be within the range of 500 meters to 1 km, to avoid reception holes. In another non-limiting example, the directional array may be a DISCOVAIR G2 (See: Squarehead Technology AS, PO Box 13, Nydalen, NO-0410 Oslo, Norway) which has a sensing range of 0.5 km to 1 km. In other embodiments, each of the ADAs 310 may hover above a communications tower 333, but not be restricted by a tether. In still other embodiments, each of the ADAs 310 or a combination of individual ADAs may be untethered and able to fly around protected region 200. In these instances, each of the untethered ADAs may be able to fly around protected region 200 freely, or may fly in a fixed formation.

Referring back to FIG. 2A, sensing zone 226 surrounds the DMR Zone 222 and the protection/reaction zone 224, and is the outermost section of protected region 200. The UAVs 240 are depicted as flying in sensing zone 226 approaching protected site 220. While the UAVs 240 are in sensing zone 226, intelligence is gathered (e.g., emitted acoustic signals are measured) in order to categorize behavior and to predict trajectory. Predictions as to behavior and trajectory of the UAVs 240 are made by the BS-CC included in protected site 220. As mentioned above, each of the ADAs 210 included in the DAAADS may be hovering around a protected site in a fixed position. Further, debris from a neutralized UAV may be sensed in the sensing zone 226 and/or in the demilitarized zone 222.

FIG. 2B illustrates an overview of tracking the debris 267 from a neutralized UAV 240. An UAV 240 approaching the protected site 220 along trajectory 269 emits sounds 262 during a target sensing time 264, which are detected by any of the ADAs 210(1), 210(2), 210(3), 210(4) in the sound path. The directional microphone arrays of the ADAs 210 receive the sounds 262, measure the acoustic signals generated by the microphones, determine speed, position, and angle of approach of the UAV 240, and transmit the speed, position, and angle of approach to the control center 132 in base station 130 along communication path 265. In the control center 132, the speed, position, and angle of approach are processed using high-performance computers (referred to as the second computing device) and artificial intelligence algorithms to predict the trajectory of the incoming UAV. The control center 110 transmits an alarm to the air defense unit 280. The air defense unit 280 neutralizes the UAV 240 (at the point along the trajectory 269 where the UAV is neutralized), by shooting projectile 282 towards the UAV 240, causing explosion 266, which generates debris 267. Debris 267 from the neutralized UAV 260 is tracked by the directional microphones of the ADAs 210 as the debris traverses an expected trajectory 268. The speed, position and angles of the debris are transmitted along communication path 265 as captured data to the control center 132 in base station 130. The second computing device in the control center 132 applies a regression algorithm to the captured data to predict future debris trajectories. When the predicted debris trajectories are determined to intersect with the protected site 220, an alert is transmitted to the protected site 220 to take measures to withstand the impact of the debris 267, take shelter and/or initiate defensive actions.

The air defense unit may be any air defense means for neutralizing an attacking UAV. The air defense unit is positioned at a grounded location around the protected region 200, as long as it is within a range of communication with the external aerial vehicle detection system 100. The air defense unit includes a communications system capable of communicating with the BS-CC 130 to receive the alarm, identification of the type of the attacking UAV and the predicted trajectories. Based on the type of the attacking UAV, the air defense unit will take countermeasures to neutralize the attacking UAV.

The second computer readable medium may also include a classifier trained with acoustic signatures of debris particles and their threat levels, or amount of danger to the protected site if the debris particle hits the protected site.

Figure 2C:
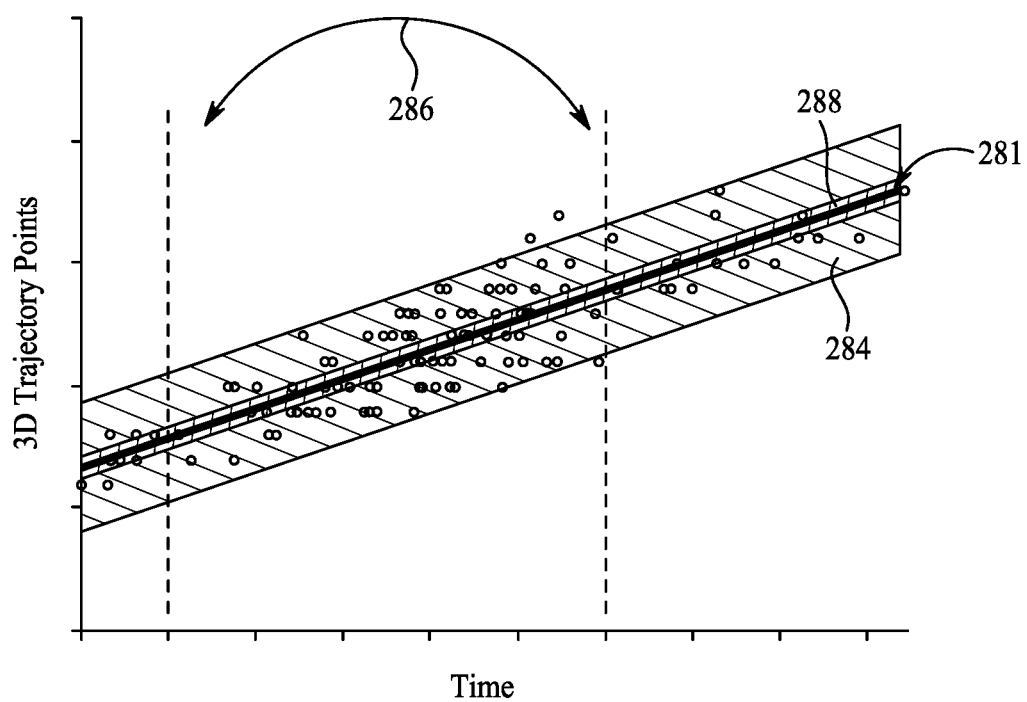
FIG. 2C is a graph of a confidence interval of trajectory data points plotted over time, according to certain embodiments.

FIG. 2C is a graph of a regression model formed by trajectory data points of the trajectory coordinates of the attacking UAV and/or the detected debris over time after neutralization. A straight line 281 is curve fitted to the trajectory points. A prediction interval 284 is determined into which the trajectory points within a sensing range 286 should fall. A confidence interval 288 of each predicted trajectory is determined by the regression algorithm. The DAAADS system predicts the possible trajectories of the attacking UAV/debris between a current position of the attacking UAV/debris and the protected site.

Figure 2D:
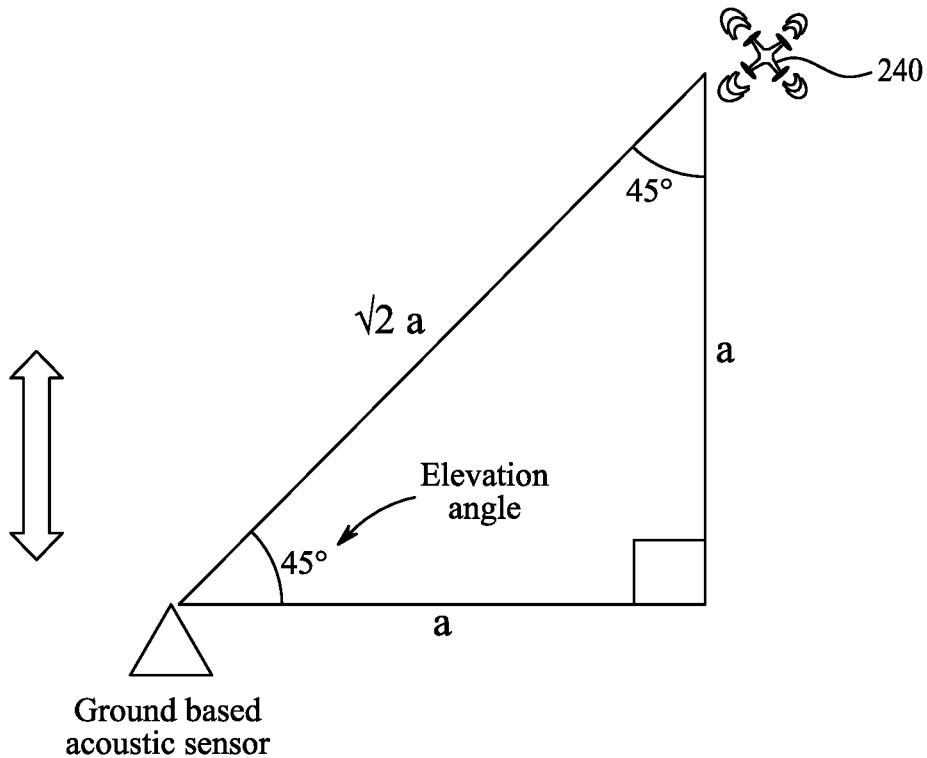
FIG. 2D is a representation of the maximum sensing distance between an attacking UAV and a ground based acoustic sensor, according to certain embodiments.

FIG. 2D illustrates the geometry representing the maximum sensing distance between a ground based acoustic sensor and an attacking UAV 240. As can be noted, for an attacking UAV 240 at a horizontal distance "a" from a ground based acoustic sensor and at an elevation "a", the distance between the ground based acoustic sensor and the attacking UAV is $\sqrt{2}$ a. However, the line of sight of the ground based acoustic sensor may be obstructed by trees and buildings, therefore the attacking UAV may not be detected.

Figure 2E:
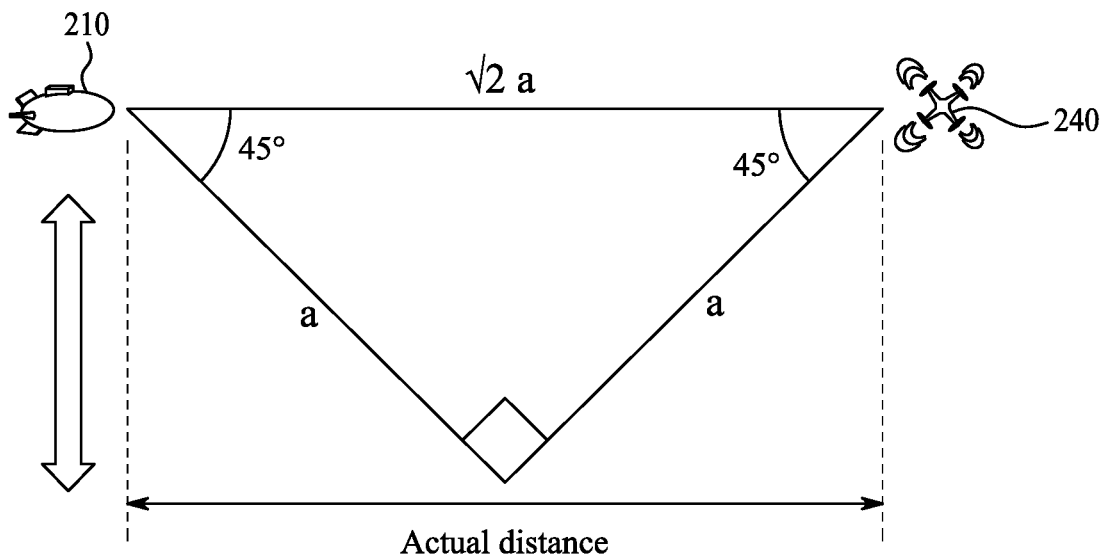
FIG. 2E is a representation of the maximum sensing distance between an attacking UAV and an airborne ADA, according to certain embodiments.

Airborne sensing can maximize the detection range. As shown in FIG. 2E, detection of an attacking UAV 240 by an ADA 240 of the DAAADS system is illustrated, in which the acoustic sensor of the directional array is on an unobstructed direct line of sight with the attacking UAV 240. The horizontal distance between the directional array of the ADA 210 and the attacking UAV 240 is $\sqrt{2}$ a, rather than "a" as in FIG. 2D, which is about a 40% improvement compared to ground acoustic sensing. Therefore, for a given acoustic sensing sensitivity, an airborne acoustic sensor can sense farther than a ground based acoustic sensor. This is equivalent to the improvement known in radar technology, in which an airborne EM radar can sense a target from a longer range than ground-based radar. The gain in range is acquired by geometry and sensors positioning in addition to the fact that media homogeneity can also contribute to harnessing most of the acoustic signals emitting from the source. The height of the directional array of an ADA 210 from the ground level may be in a range of 40 meters to 1 kilometer.

FIG. 3 illustrates an ADA 310 connected to a tether 331, having length, L. The tether 331 is connected is connected to a tower 333 having height, H. In some embodiments, the DAAADS may include a plurality of towers 333 of height H throughout a protected region. Each tower 333 may be located at a fixed radius from the protected site and equidistant from each other tower. A top portion of each fixed tower 333 is connected to one of a plurality of tethers 331 (e.g., ropes, chains, etc.), each tether 331 of length L. Each ADA may include an air balloon, each air balloon having a lower mount, may be attached via the lower mount to tether 331. Each air balloon is configurable to hold the first computing device and the directional array of an ADA 310 at a fixed height L+H above the ground. The length L of each tether may differ, depending on the topography of the protected region 200, as variances in the level of the ground may necessitate an adjustment of the length. However, the ADAs should form a circle of radius R perpendicular to a vertical axis of the protected site. The distance between towers depends on the microphone array sensing range. In an non-limiting example, the microphone array may have a sensing range of 0.5 kilometers to 1 kilometer, (See: Squarehead Unveils Discovair G2, press release, Aug. 3, 2018, Squarehead Technology, LLC, 580 Herndon Parkway, Suite Number 350, Herndon, Va., U.S.A). Therefore, the distance between the towers should be at least 500 meters to avoid black spots in coverage.

Also depicted in FIG. 3 and as referenced throughout the descriptions of FIG. 1 and FIG. 2A are directional microphone array 311, critical circuitry 312 motor 318, and propeller 319. In accordance with the present disclosure, a directional microphone array 311 senses acoustic signals emitted from an approaching attacking UAV. Included in critical circuitry 312 are a first computing device 313 executing code for determining a direction and a distance of each UAV approaching ADA 310, a GPS receiver 314 configured to locate the ADA in a three-dimensional space, and first transceiver circuitry 315 for sending/receiving wireless communications signals. Motor 318 may drive propeller 319 such that ADA 310 is able to hover at a fixed height of H+L above the ground. Critical circuitry 312 may further include navigation circuitry 316. Navigation circuitry 316 may include the GPS receiver 314 or it may provide navigation capabilities in addition thereto.

Figure 4A:
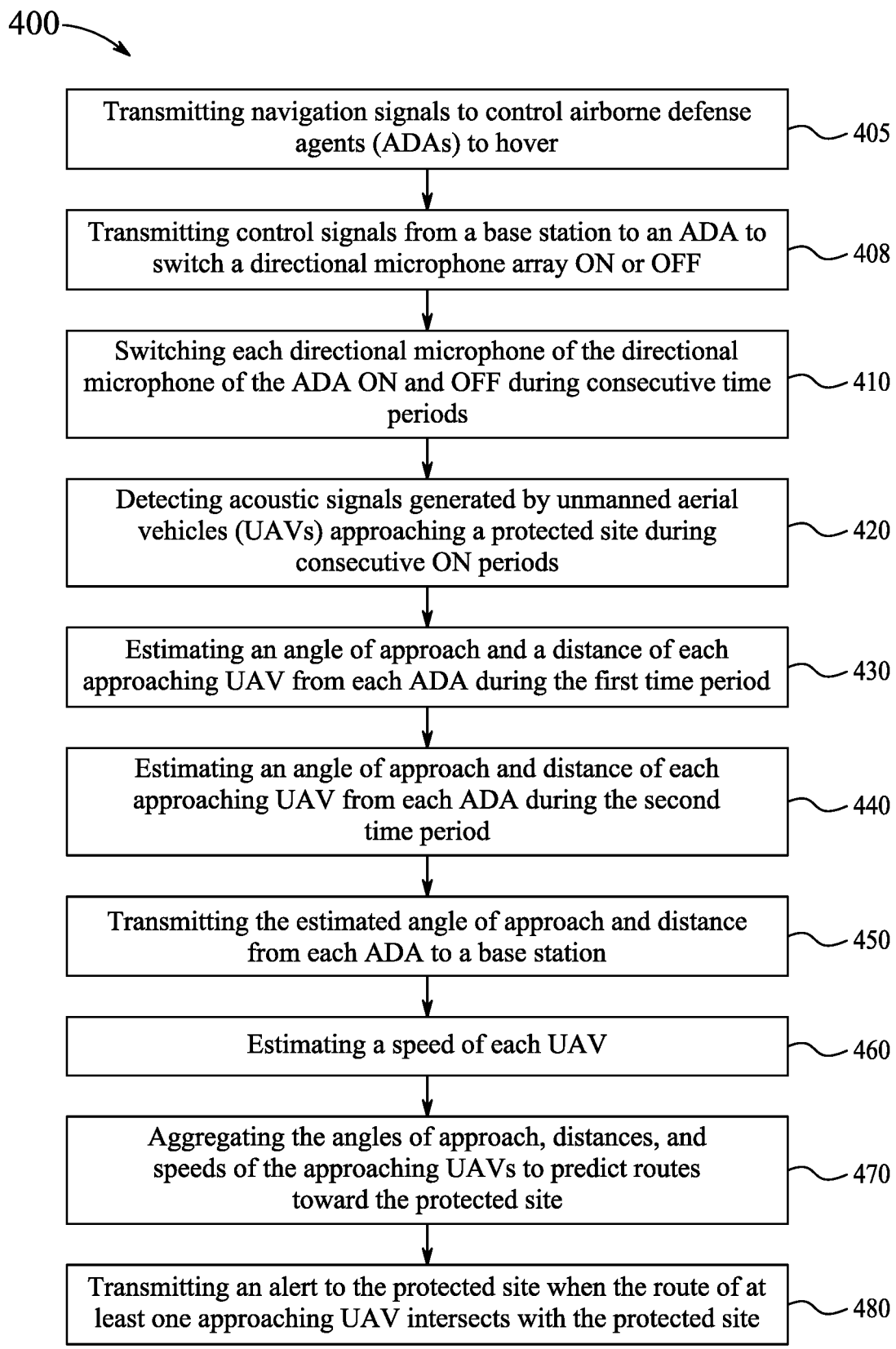
FIG. 4A is an exemplary flowchart of a method for implementing a distributed airborne acoustic anti-drone intelligence system for predicting trajectories of an attacking UAV, according to certain embodiments.

FIG. 4A is a flowchart describing a method 400 for detecting trajectories of unmanned aerial vehicles (UAV) approaching a protected site by a plurality of airborne defense agents (ADAs). The method 400 includes, at a step 410, switching each directional microphone of a directional microphone array of an ADA ON and OFF during consecutive time periods in which only one directional microphone is ON in a time period. At step 420, acoustic signals generated by UAVs approaching the protected site during consecutive ON periods are detected. A first processing circuitry of an ADA estimates an angle of approach and a distance of each approaching UAV from each ADA during the first time period at step 430. At a step 440, during the second time period, an angle of approach and distance of each approaching UAV from each ADA is estimated.

The estimated angle(s) of approach and distance(s) from each ADA are transmitted to the base station at step 450. A second processing circuitry included in the base station estimates, at a step 460, a speed of each UAV. The estimating may include subtracting the distance estimated during a first ON time period from the distance measured during a second ON time period for each of three equidistant ADAs and dividing by the difference between the first and second time periods. At step 470, the angles of approach, distances, and speeds of the approaching UAVs are aggregated to predict trajectories/trajectories towards the protected site. At step 480, an alert is transmitted to the protected site when the trajectory/trajectory of at least one approaching UAV intersects with the protected site.

In some aspects of the present disclosure, the base station may perform an optional step 405 to transmit to each ADA navigation signals to control the ADAs to hover at a fixed height from the ground, at a fixed radius from the protected site, and equidistant from each other ADA. Additionally and/or alternatively, the method 400 for detecting trajectories of unmanned aerial vehicles (UAV) approaching a protected site may include an optional step 408 for transmitting control signals from the base station to each ADA to switch each directional microphone array ON to start detecting acoustic signals or OFF to sleep based on a number of approaching UAVs.

The first processing circuitry of each ADA may convert the acoustic signals from the time domain to the frequency domain. Any signal processing technique known in the art may be used to perform the conversion from the time domain to the frequency domain. Responsive to conversion into the frequency domain, a set of frequency components is identified, and distance to an approaching UAV is estimated using the set of frequency components.

Each directional microphone of the directional microphone array of an ADA may be oriented to receive acoustic signals from a different angle. The first processing circuitry may measure the amplitude, A, of each acoustic signal during the alternating ON periods. An angle of arrival, $\omega$, of the acoustic signal may be detected from the angle of the directional microphone receiving the greatest amplitude. Estimates of the distance between each ADA and a UAV may be made by measuring a propagation delay, $\tau$, of the acoustic signal having the greatest amplitude.

The second processing circuitry may predict the trajectory of an approaching UAV by triangulating the acoustic signals received by the directional microphone arrays of three equidistant ADAs. Further, the second processing circuitry may apply the aggregated angles of approach, distances, and speeds of the approaching UAVs to a machine learning processor to predict the trajectories/trajectories of the approaching UAVs. In some embodiments, the machine learning processor may be included in the BS-CC and may implement a regression based machine learning algorithm to predict the trajectories/trajectories of the approaching UAV.

In related aspects, a non-transitory computer readable medium having instructions stored thereon that, when executed by one or more processors, cause the one or more processors to perform a method for detecting trajectories of unmanned aerial vehicles (UAV) approaching a protected site by a plurality of airborne defense agents (ADAs). The method may include switching each directional microphone of a directional microphone array of an ADA ON and OFF during consecutive time periods in which only one directional microphone is ON in a time period. Acoustic signals generated by UAVs approaching the protected site may be detected during consecutive ON periods. A first processing circuitry of an ADA may estimate an angle of approach and a distance of each approaching UAV from each ADA during the first time period. Furthermore, an angle of approach and distance of each approaching UAV from each ADA may be estimated during the second time period.

The estimated angle(s) of approach and distance(s) from each ADA may be transmitted to a base station. A second processing circuitry included in the base station may estimate a speed of each UAV by subtracting the distance estimated during a first ON time period from the distance measured during a second ON period for each of three equidistant ADAs and dividing by the difference between the first and second time periods. Distances and speeds of the approaching UAVs are aggregated to predict trajectories towards the protected site of the approaching UAV. Finally, an alarm may be transmitted to the protected site when the trajectory of at least one approaching UAV intersects with the protected site.

The non-transitory computer readable medium may also orient each directional microphone of the directional microphone array of an ADA to receive acoustic signals from a different angle. Processing circuitry of the ADA may be used to determine the amplitude (A) of each acoustic signal during the alternating ON periods. Further, the processing circuitry may also detect an angle of arrival ($\omega$) of the acoustic signal based on the orientation of the directional microphone array sensing the acoustic signal having the largest amplitude. Moreover, the processing circuitry may estimate the distance between the ADA and an approaching UAV by measuring a propagation delay ($\tau$) of the acoustic signal having the greatest amplitude.

The non-transitory computer medium may also predict, by the second processing circuitry included in the base station, the trajectory/trajectory of each approaching UAV by triangulating the acoustic signals received by the directional microphone arrays of three equidistant ADAs. The second processing circuitry may apply aggregated angles of approach, distances, speeds, and predicted trajectories of the approaching UAVs to a machine learning processor to predict the trajectories which intersect with the protected site. To predict the trajectories of the approaching UAV, the machine learning processor may implement any machine learning algorithm including, but not limited to, supervised/unsupervised/semi-supervised learning algorithms, regression-based algorithms, clustering algorithms, Bayesian algorithms, decision tree algorithms, regularization algorithms, instance-based algorithms, association rule learning algorithms, artificial neural network algorithms, deep learning algorithms, and/or a combination thereof.

Figure 4B:
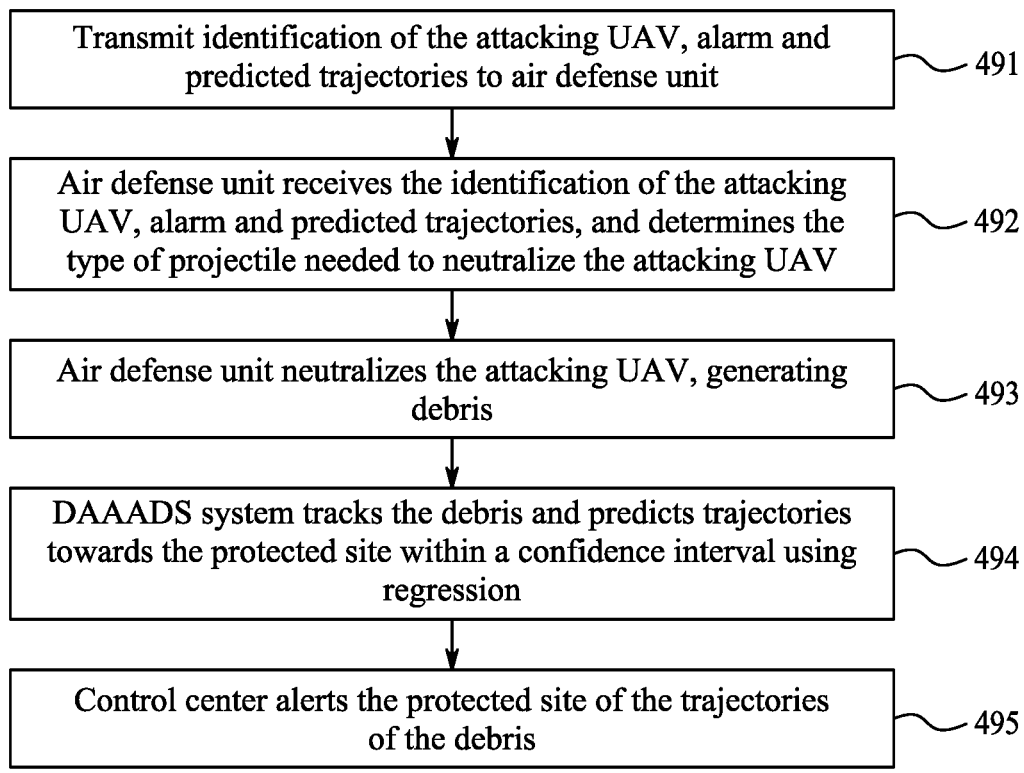
FIG. 4B is an exemplary flowchart of a method for implementing a distributed airborne acoustic anti-drone intelligence system for tracking and neutralizing an attacking UAV, and predicting debris trajectories, according to certain embodiments.

FIG. 4B is a flowchart describing a method 400 for neutralizing an attacking UAV 240 which has been identified as to type and has trajectories predicted by the method of FIG. 4A. The method 400 includes, at a step 491, transmitting the alarm, the identification of the attacking UAV 240 and predicted trajectories to the air defense unit 280. At step 492, the air defense unit 280 receives the alarm, the identification of the attacking UAV 240 and predicted trajectories and determines the type of projectile needed for neutralizing the attacking UAV 240. At step 493, the air defense unit 280 launches the projectile 282 and neutralizes the attacking UAV, generating debris. At step 494, the ADAs 210 of the DAAADS system track the debris and predict trajectories of the debris towards the protected site 220 within the confidence interval 288 using the regression algorithm of the second computing device. At step 495, the control center alerts the protected site of the trajectories of the debris.

FIGS. 5-12 provide more detailed descriptions of the functionality of (e.g., the various tasks executed by) the DAAADS in detecting a UAV or debris approaching a protected site. It is to be understood that there may be multiple different ways to perform these tasks in addition to what is described in FIGS. 5-12, and/or there may be multiple iterations for performing what is described.

Figure 5:
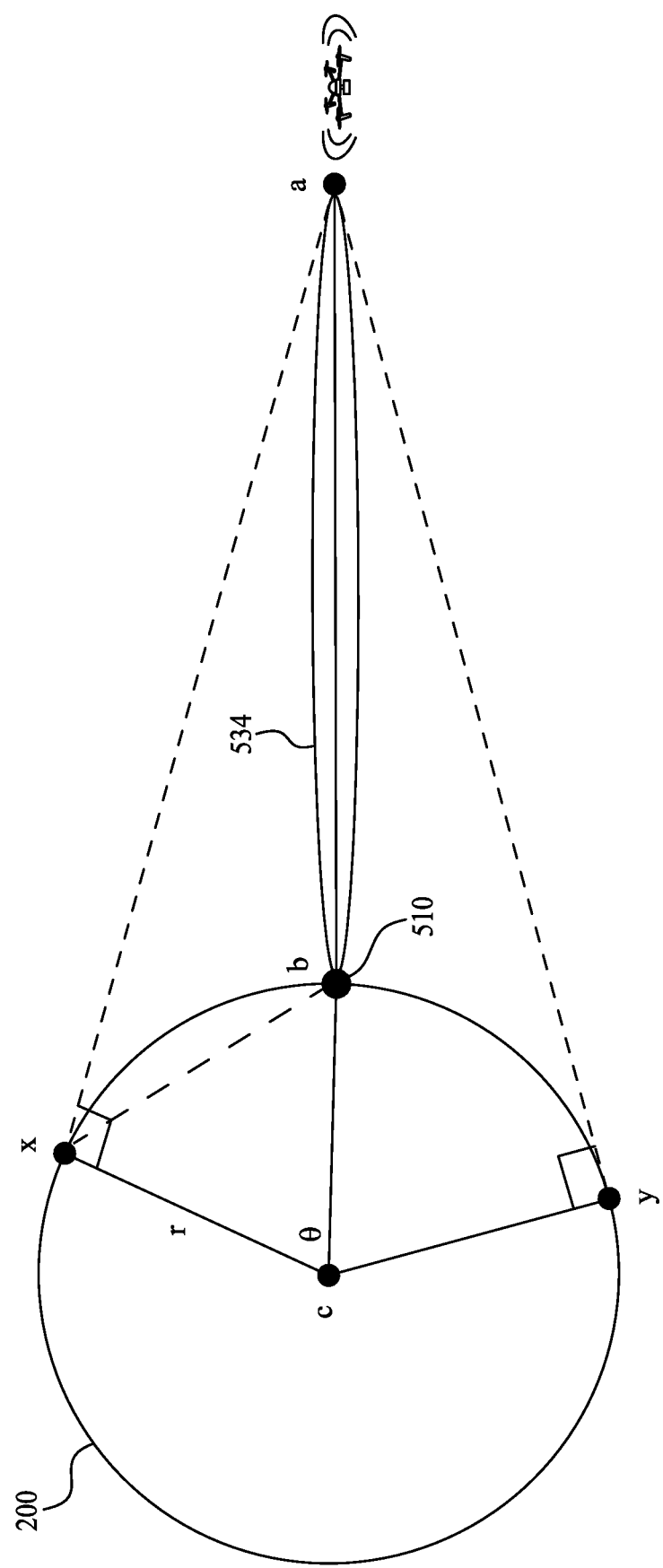
FIG. 5 illustrates a microphone pattern for predicting the direction of an attacking UAV or debris from a neutralized UAV towards a protected site, according to certain embodiments.

FIG. 5 illustrates one process by which DAAADS may predict the direction of an incoming attack from an attacking UAV (UAV) or its debris after neutralization which is approaching protected region 200, having center, C, and radius, r. For the purposes of predicting direction of an incoming attack or debris, points x, y, and b around the circumference of protected region 200 are of interest, as is point a. As illustrated, an airborne defense agent (ADA) is located at point b and the UAV is located at point a. The microphone pattern 534 is indicative of the acoustic signal emitted by the UAV at point a and sensed by the ADA at point b. Based on the microphone pattern 534, the initial coordinate of an approaching UAV 240 or debris 267 from a neutralized UAV can be estimated.

Estimating the initial position of the approaching UAV 240 or debris 267 from a neutralized UAV may enable the control center to initiate an early alarm to the protected site, the alarm indicating that an imminent threat may be approaching protected region 200 from a specific direction. The length of line segment ab, or the in a straight line between the UAV at point a and the ADA at point b, may be calculated based on the propagation delay of the sound originating at the UAV multiplied by the speed of sound (approximately 343 m/s).

To improve estimates as to the location of the UAV, three points around the protected region 200 may be used to triangulate the position of the UAV. As illustrated, points x, y, and b are these three points. Initially the locations (e.g., coordinates) of points b and a are known, and are used in determining the locations of points x and y. First, tangents to the protected region 200, one above and one below the known location the ADA 210 (e.g., point b) passing through the known location of the UAV/debris (e.g. point a), are taken. The intersections of these tangent lines with protected region 200 are the points x and y. Additionally and/or alternatively, by approximating $\ominus \approx 60°$, the coordinates of x and y can be approximated. After establishing the three fixed points, x, y, and b, it is possible to estimate the coordinates of the attack in a three-dimensional space via triangulation using the edges of the right triangles (e.g., $\Delta$CXA and $\Delta$CYA).

Figure 6A:
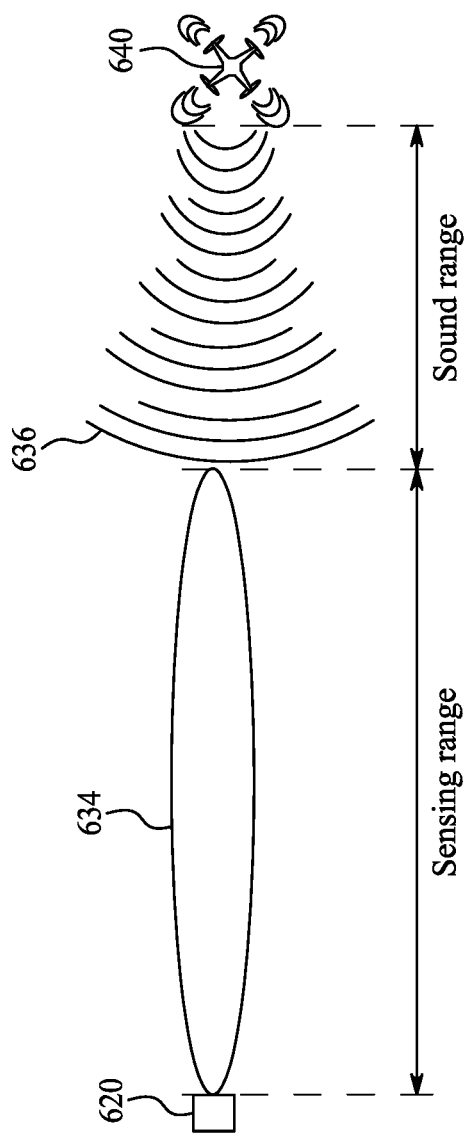
FIG. 6A is an exemplary illustration of an acoustic signal emitted by an approaching attacker, as detected by an airborne defense agent, according to certain embodiments.

FIG. 6A illustrates the sound components involved in an ADA 610 sensing/detecting an approaching UAV 640. As sound waves 636 are emitted from the approaching UAV 640, the sound waves 636 will be detectable by the array of microphones in ADA 610 once the sound waves 636 have entered the sensing zone of the microphone array. The sensing zone of the microphone array is indicated by a microphone pattern 634 which may be substantially similar/identical to the microphone pattern 534. To track the approaching UAV 640 from a neutralized UAV as accurately as possible, the low frequency components of sound waves 636 are monitored. Tracking the lower frequency components of sound emitted from approaching UAV 640 is more effective. Given the longer wavelength of lower frequency sound waves, lower frequency components of sound waves 636 will propagate further away from their source (e.g., UAV 640) than the higher frequency components of sound waves 636. The ADA 610 may transmit data collected about sound waves 636 generated by UAV 240 to a BS-CC substantially similar/identical to the BS-CCs described above (e.g., BS-CC 132) for analysis.

Figure 6B:
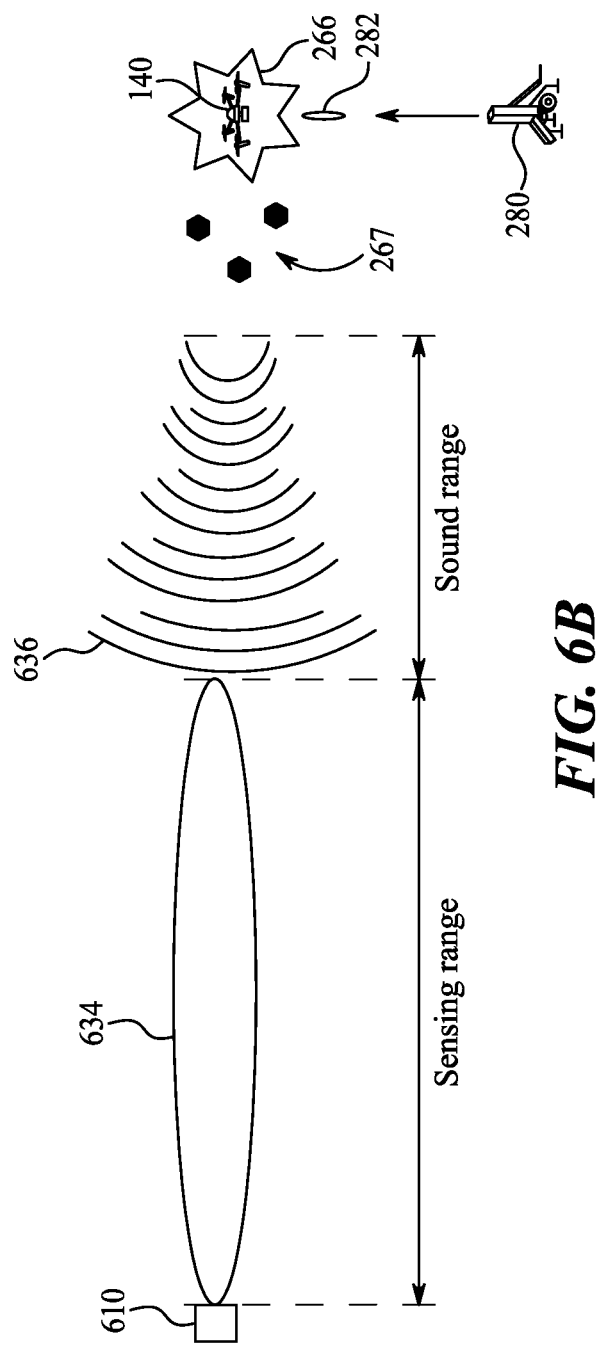
FIG. 6B is an exemplary illustration of an acoustic signal emitted by approaching debris from a neutralized UAV, as detected by an airborne defense agent, according to certain embodiments.

Detecting debris 267 from a neutralized UAV is substantially similar to detecting an approaching UAV 610, shown in FIG. 6A. FIG. 6B illustrates the sound components involved in an ADA 610 sensing/detecting debris 267 from a neutralized UAV (shown as UAV 240 in cloud indicating explosion 266). As sound waves 636 are emitted from the debris 267 (i.e., wind sounds, crackling from burning debris, and the like), the sound waves 636 will be detectable by the array of microphones in ADA 610 once the sound waves 636 have entered the sensing range of the microphone array. The sensing range of the microphone array is indicated by a microphone pattern 634 which may be substantially similar/identical to the microphone pattern 534. To track the approaching debris 267 as accurately as possible, the low frequency components of the sound waves 636 are monitored. Tracking the lower frequency components of sound emitted from approaching debris is more effective. Given the longer wavelength of lower frequency sound waves, lower frequency components of sound waves 636 will propagate further away from their source than the higher frequency components of sound waves 636. The ADA 610 may transmit data collected about sound waves 636 generated by debris 267 to a BS-CC substantially similar/identical to the BS-CCs described above (e.g., BS-CC 132) for analysis.

Figure 7A:
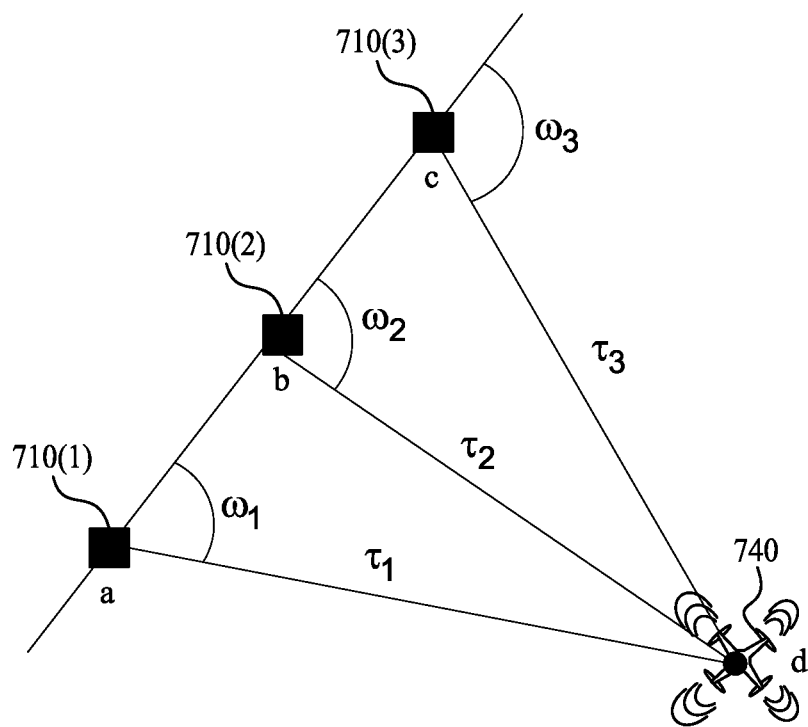
FIG. 7A illustrates position triangulation of debris from a neutralized UAV approaching a protected site by airborne defense agents surrounding the protected site, according to certain embodiments.

FIG. 7A provides further detail on the localization/triangulation of an UAV from a neutralized UAV approaching a protected site by three ADAs. Three ADAs, 710(1), 710(2), and 710(3) (collectively "the ADAs 710") are shown detecting approaching UAV 740. To triangulate the position of UAV 740 (e.g., find the coordinates of UAV in a three-dimensional space), the ADAs 710 sense acoustic signals emitted by UAV 740. Responsive to sensing the acoustic signals, each ADA of the ADAs 710 establishes a relative location by determining a propagation delay ($\tau$) and angle of arrival ($\omega$) of the sensed acoustic signals using the array of directional microphones included in each respective ADA of the ADAs 710. Propagation delays are measured while angles of arrivals are estimated.

FIG. 7A illustrates each respective ADA of the ADAs 710 having a measured propagation delay and an estimated angle of arrival of the sensed acoustic signal emitted from an attacking UAV 740. For example, ADA 710(1), located at point a, uses the acoustic signal(s) emitted from UAV 740 to measure a propagation delay $\tau_1$ and to estimate an angle of arrival $\omega_1$ of UAV 40. Similarly, ADA 710(2), located at point b, measures a propagation delay ($\tau_2$) and estimates an angle of arrival ($\omega_2$) of the acoustic signals emitted from UAV 740, and ADA 710(3), located at point b, measures a propagation delay ($\tau_3$) and estimates an angle of arrival ($\omega_3$) of the acoustic signals emitted from UAV 740. A combination of these measurements and estimations may be used to triangulate the position of UAV 740 as it approaches. Lengths of the sides of the triangles $\Delta$abd and $\Delta$bcd formed between the ADAs 710 and UAV 740 (e.g., the line segments ad, bd, and cd) may be used to calculate the position of UAV 740 in a three-dimensional space.

Figure 7B:
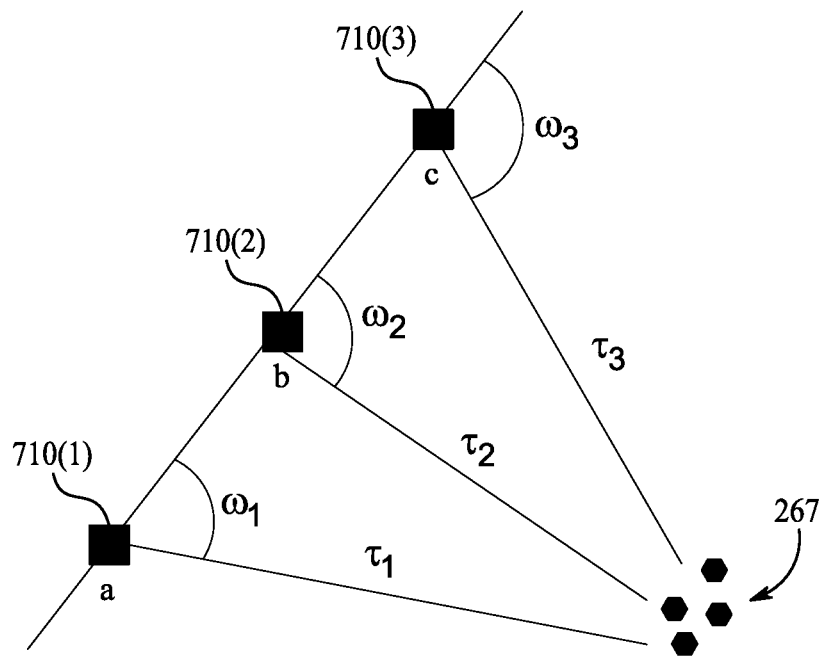
FIG. 7B illustrates position triangulation of an attacking UAV approaching a protected site by airborne defense agents surrounding the protected site, according to certain embodiments.

FIG. 7B illustrates each respective ADA of the ADAs 710 having a measured propagation delay and an estimated angle of arrival of the sensed acoustic signal emitted from debris 267 from a neutralized UAV. For example, ADA 710(1), located at point a, uses the acoustic signal(s) emitted from the debris 267 to measure a propagation delay $\tau_3$ and to estimate an angle of arrival $\omega_3$ of the debris 267. Similarly, ADA 710(2), located at point b, measures a propagation delay ($\tau_2$) and estimates an angle of arrival ($\omega_t$) of the acoustic signals emitted from the debris, and ADA 710(3), located at point b, measures a propagation delay ($\tau_3$) and estimates an angle of arrival ($\omega_3$) of the acoustic signals emitted from the debris. A combination of these measurements and estimations may be used to triangulate the position of the debris as it approaches. Lengths of the sides of the triangles $\Delta$abd and $\Delta$bcd formed between the ADAs 710 and debris 267 (e.g., the line segments ad, bd, and cd) may be used to calculate the position of the debris 267 in a three-dimensional space.

Although FIG. 7A and FIG. 7B depict three ADAs (710(1), 710(2), and 710(3)) triangulating the position of UAV 740 or debris 267 as it traverses distance x, in accordance with the present disclosure, it is possible to triangulate the position of UAV 740 or debris 267 with four, five, ten or more ADA depending on various factors, including but not limited to the trajectory of the approaching UAV or debris and the formation of the ADA. Provided there are no restrictions/limitations caused by system overhead (e.g., insufficient bandwidth), all ADAs included in the DAAADS may track an approaching UAV or debris at once. In general, the greater the number of ADAs triangulating the position of an approaching UAV or debris, the greater the accuracy of the results.

Figure 8:
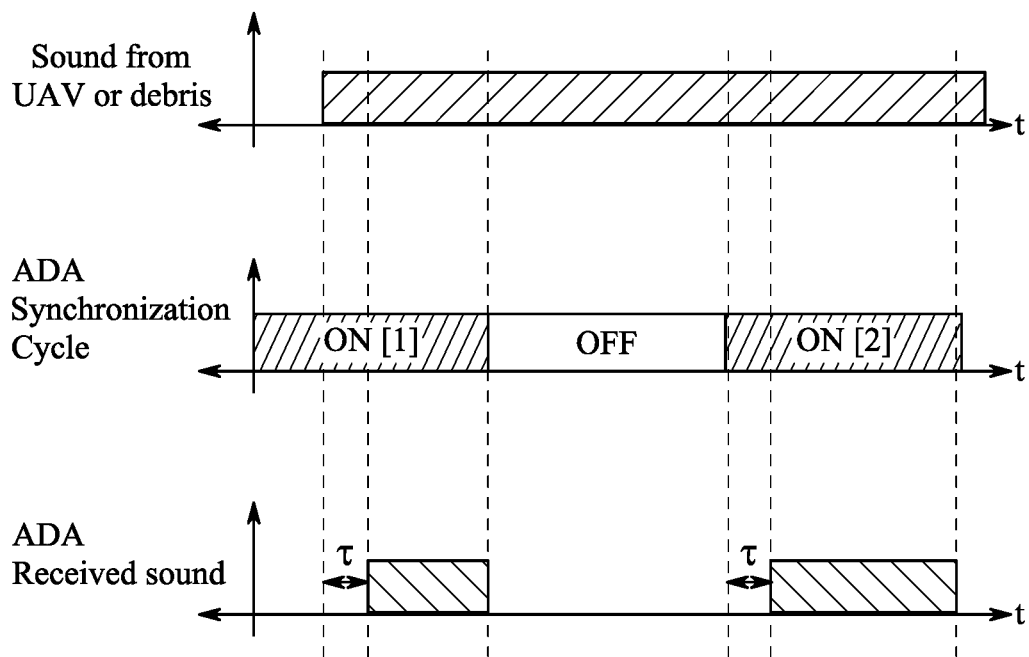
FIG. 8 illustrates measurement of a propagation delay of an acoustic signal emitted by an attacking UAV or debris from a neutralized UAV, according to certain embodiments.

FIG. 8 illustrates measurement of propagation delay, or the time required for a sound to travel from the source/origin of the sound to a location/object sensing that sound. In accordance with the present disclosure, an attacking UAV or debris emitting acoustic signals serves as the source/origin and an airborne defense agent sensing acoustic signals emitted from an attacking UAV or debris serves as the sensing object. Synchronizing ADAs to a reference channel enables the ADAs to listen to the same acoustic signals at the same time, enabling propagation delay, $\tau$, to be measured. Propagation delay may be measured by switching ON and OFF microphone arrays included in the ADAs simultaneously and periodically.

As illustrated in FIG. 8, an ADA may measure $\tau$ during a first ON cycle (ON[1]). The acoustic signal emitted from an UAV or debris is sensed after propagating for $\tau$ seconds, but there is no way to distinguish the propagation time from the origination time. To resolve this issue, a measurement of $\tau$ is made during a second ON cycle (ON[2]) to start the ON cycle.

Minimum and maximum values of $\tau$ may be identified according to system specifications and any measured delay should fit within that range. For instance, the maximum value for $\tau$ may be based on the maximum sensing range of the system while the minimum value of $\tau$ may be based on the sensitivity of the measurement device(s) (e.g., the microphone array included in each ADA(s) sensing the emitted acoustic signal(s)). Also illustrated in FIG. 8 is the ADA receiving the emitted acoustic signal, after the propagation delay $\tau$, and during each of the first and second ON cycles.

Figure 9:
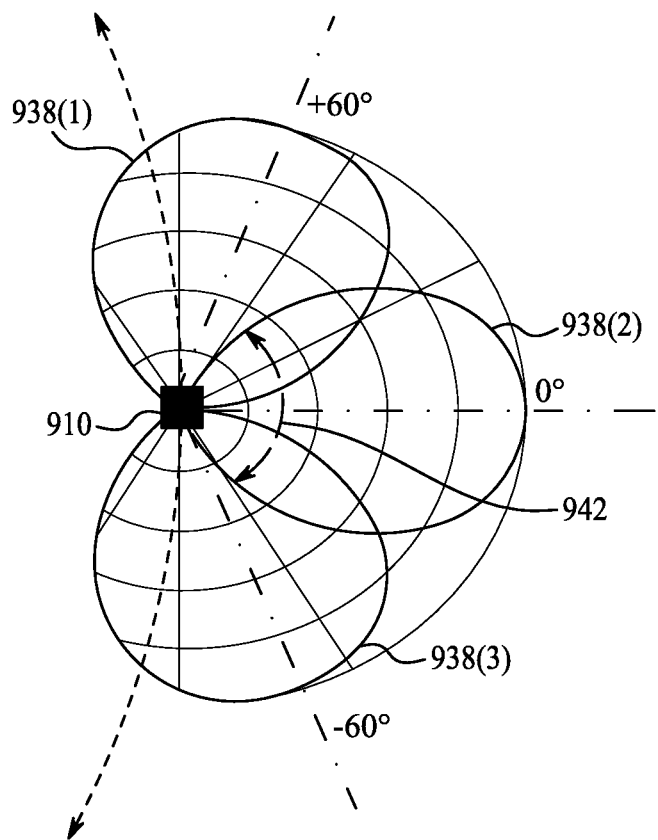
FIG. 9 depicts a process by which an angle of arrival of an attacking UAV or debris from a neutralized UAV approaching a protected site is estimated, according to certain embodiments.

FIG. 9 depicts a process by which an angle of arrival ($\omega$) may be estimated. The array of microphones included in an ADA (e.g., ADA 910) has three loops, loop 1 (938(1)), loop 2 (938(2)), and loop 3 (938(3)) (collectively "the loops 938"), each separated by 60°. The angle of arrival is associated with the loop in which the strongest acoustic signal is received. For instance, if the strongest acoustic signal is sensed within loop 1 (938(1)), angle of arrival is estimated to be +60°. To associate the received acoustic signal to any of the loops, ADA 910 may switch the power between the loops in an alternating fashion, thereby enabling ADA 910 to determine which of the loops 938 is receiving the strongest signal (e.g., the signal having the highest power). To improve the accuracy of the estimation of the angle of arrival, more loops may be included. More loops may be included by narrowing/decreasing the beam width 942 of any/all of the loops 938 of the microphone array. Decreasing the beam width of the loops 938 also serves to reduce interference between individual loops of the microphone array.

Figure 10A:
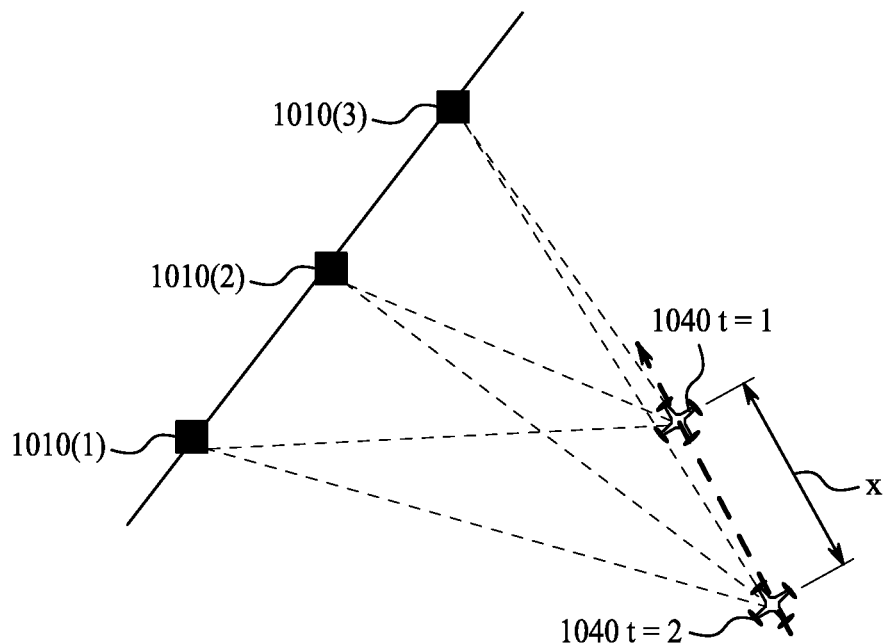
FIG. 10A illustrates determination, by a group of airborne defense agents, of the speed of an attacking UAV approaching a protected site, according to certain embodiments.

FIG. 10A illustrates the determination by ADAs 1010(1), 1010(2), and 1010(3) (collectively "the ADAs 1010". As shown in the figure, UAV has traversed a distance x on its trajectory at a certain speed. By determining the distance x that UAV 1040 has travelled between two detection times t=1 and t=2, the ADAs 1010 can determine the speed at which UAV 1040 is travelling.

Figure 10B:
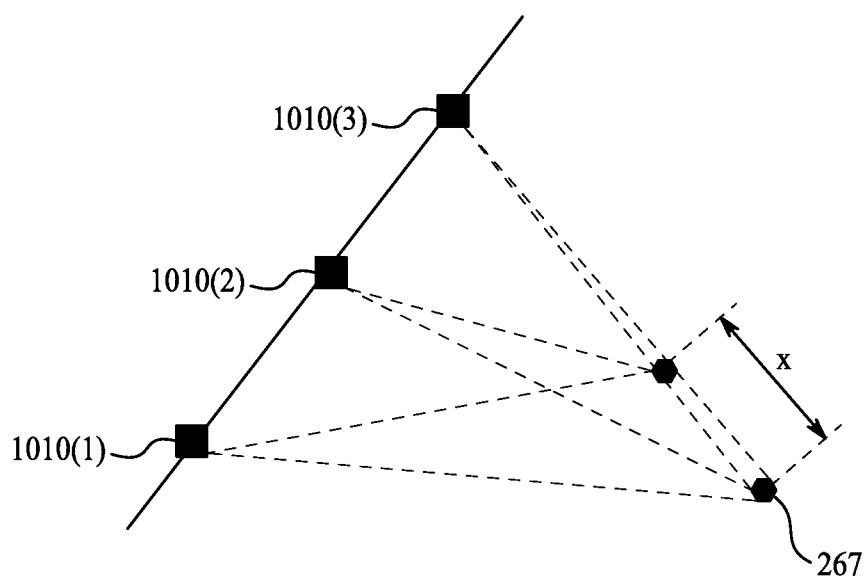
FIG. 10B illustrates determination, by a group of airborne defense agents, of the speed of debris from a neutralized UAV approaching a protected site, according to certain embodiments.

FIG. 10B illustrates the determination by ADAs 1010(1), 1010(2), and 1010(3) (collectively "the ADAs 1010". As shown in the figure, a piece of debris 267 has traversed a distance x on its trajectory at a certain speed. By determining the distance x that debris 267 has travelled between two detection times t=1 and t=2, the ADAs 1010 can determine the speed at which the debris 267 is travelling.

For either the UAV 1040 of FIG. 10A or the debris 267 of FIG. 10B, the calculations for distance and speed are similar. The distance x is the distance between two localization points, and is calculated by triangulating the position two consecutive instances of time (using the propagation delay ($\tau$) and an angle of arrival ($\omega$) estimated by the ADAs 1010 and a second localization point being triangulated by the ADAs 1010). The first localization point is calculated by the ADAs 1010, as described above and below. The localization points are measured according to a localization frequency ($f_{lo}$) which may equal 1/T, where T is approximately the time interval between a first at time $t_1$ and the second localization point is calculated at time $t_2$, then $T=t_2-t_1$. Thus, as $f_{lo}$ is the inverse of T, a higher localization frequency value reflects the system localizing the approaching UAV 1040 or the debris 267 more often than at a lower localization frequency. Upon configuring the system, T may be chosen and the distance x can be approximated as a straight line. Accordingly, the calculated values of distance x and $f_{lo}$ can be used to determine the speed, s, of UAV 1040 or debris 267 by multiplying x by $f_{lo}$ ($s=xf_{lo}$).

In accordance with the present disclosure, a speed profile, including a minimum speed $S_{min}$ and a maximum speed $S_{max}$ for an UAV or debris approaching a protected site may be constructed to reflect the change in speed of the approaching UAV or debris as it travels along a trajectory. Accuracy of the profiling is limited by the segmentation resolution, and the speed profile may be used in estimating possible trajectories of an approaching UAV or debris.

A UAV 1040 or debris 267 approaching a protected site may traverse a fixed trajectory. In accordance with the present disclosure, to generate a speed profile for an approaching UAV or debris, the DAAADS may vary the localization frequency of the ADAs included therein. Varying the localization enables the DAAADS to determine a maximum and a minimum speed for the approaching UAV 1040 or debris 267 between two consecutive localization points over a given time interval, and to predict, from the determination, possible trajectories the approaching UAV or debris may follow.

Figure 11A:
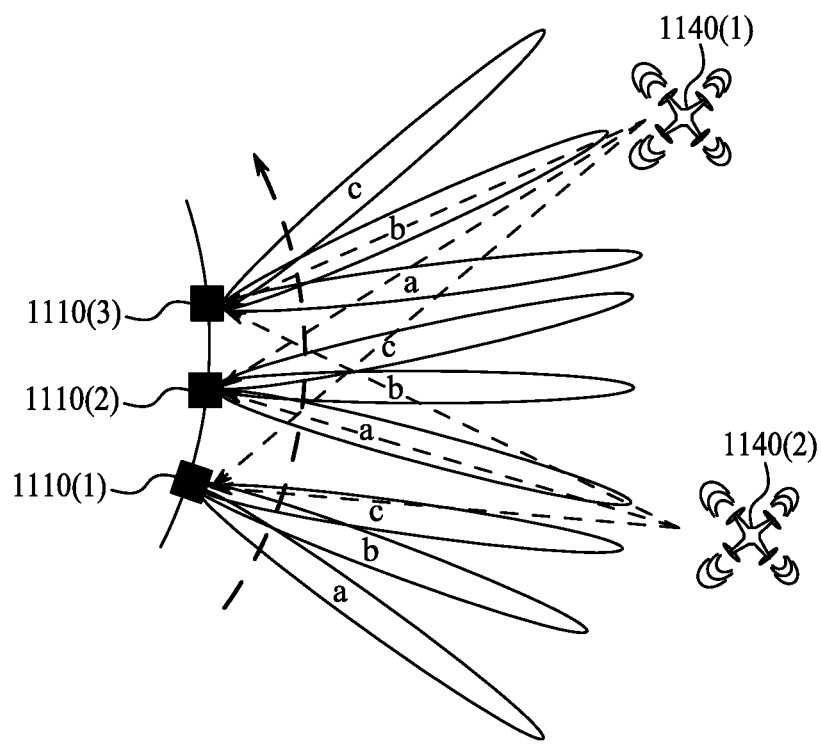
FIG. 11A illustrates an exemplary determination of the number of attacking UAVs approaching a protected site by airborne defense agents, according to certain embodiments.

FIG. 11A depicts an exemplary determination of the numbers of approaching attacking UAVs 1140 that may be counted by airborne defense agents. A microphone array included in ADA 1110(1), 1110(2), and 1110(3) (collectively "the ADAs 1110") generate loops. The microphone array of each of the ADAs 1110 generates loop a, loop b, and loop c. To count the number of approaching UAVs, one loop per ADA at a time receives the acoustic signal with the highest power ($P_h$) emitted from an UAV approaching a protected site. Associating an attacking UAV, such as UAV 1140(1) and/or 1140(2) (collectively, "the UAVs 1140") to a single loop of the loops emitted by the microphone arrays of the ADAs 1110 reduces conflicts arising from potential inaccuracies in propagation delays measured and/or angles of arrival estimated by the ADAs 1110 in counting the number of approaching UAVs.

Figure 11B:
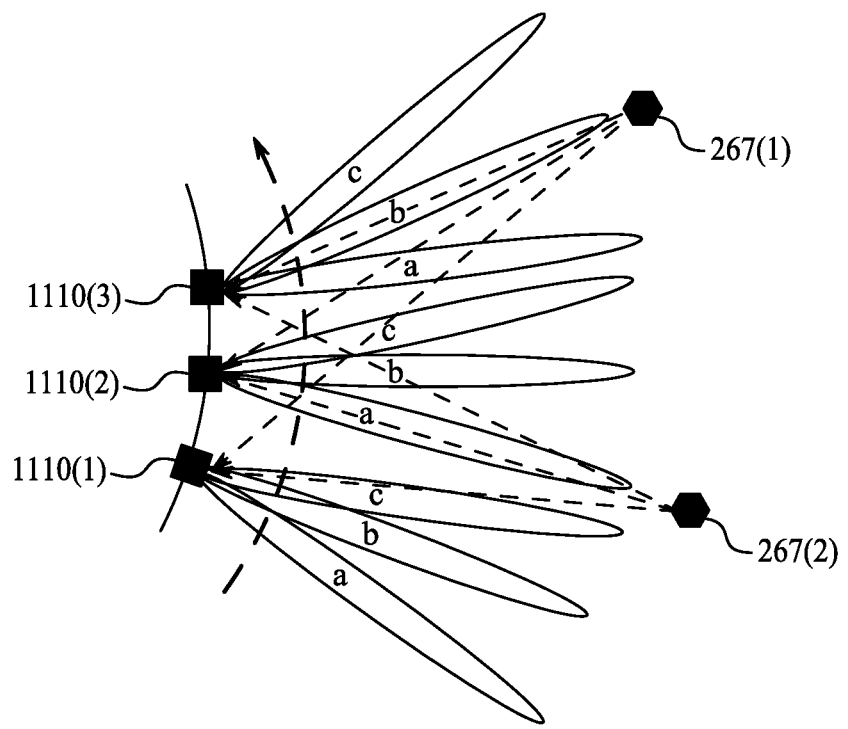
FIG. 11B illustrates an exemplary determination of the number of particles of debris from a neutralized UAV approaching a protected site by airborne defense agents, according to certain embodiments.

FIG. 11B depicts an exemplary determination of the numbers of the particles of debris 267 which may be counted by airborne defense agents, similarly to determining the numbers of UAVs approaching in FIG. 11A. There may be a plurality of particles of debris 267 generated by the neutralization of a UAV. Some of these particles may be on a trajectory towards the protected site. The microphone array included in each of ADA 1110(1), 1110(2), and 1110(3) (collectively "the ADAs 1110") generates loops. The microphone array of each of the ADAs 1110 generates loop a, loop b, and loop c. To count the number of particles of debris 267, one loop per ADA at a time receives the acoustic signal with the highest power ($P_h$) emitted from a particle of debris approaching a protected site. For example, acoustic signals from debris 267(1) may be received at each of ADA 1110(1), 1110(2), and 1110(3). The loop b of the directional microphone array of ADA 1110(3) may receive the signal with the highest power acoustic signal from debris 267(1). The loop a of the microphone array of ADA 1110(2) may receive the signal with the highest power acoustic signal from debris 267(2). Associating a particle of debris 267(1) and/or 267 (2) (collectively, "the debris 267") to a single loop of the loops emitted by the microphone arrays of the ADAs 1110 reduces conflicts arising from potential inaccuracies in propagation delays measured and/or angles of arrival estimated by the ADAs 1110 in counting the number of particles of approaching debris.

Figure 12A:
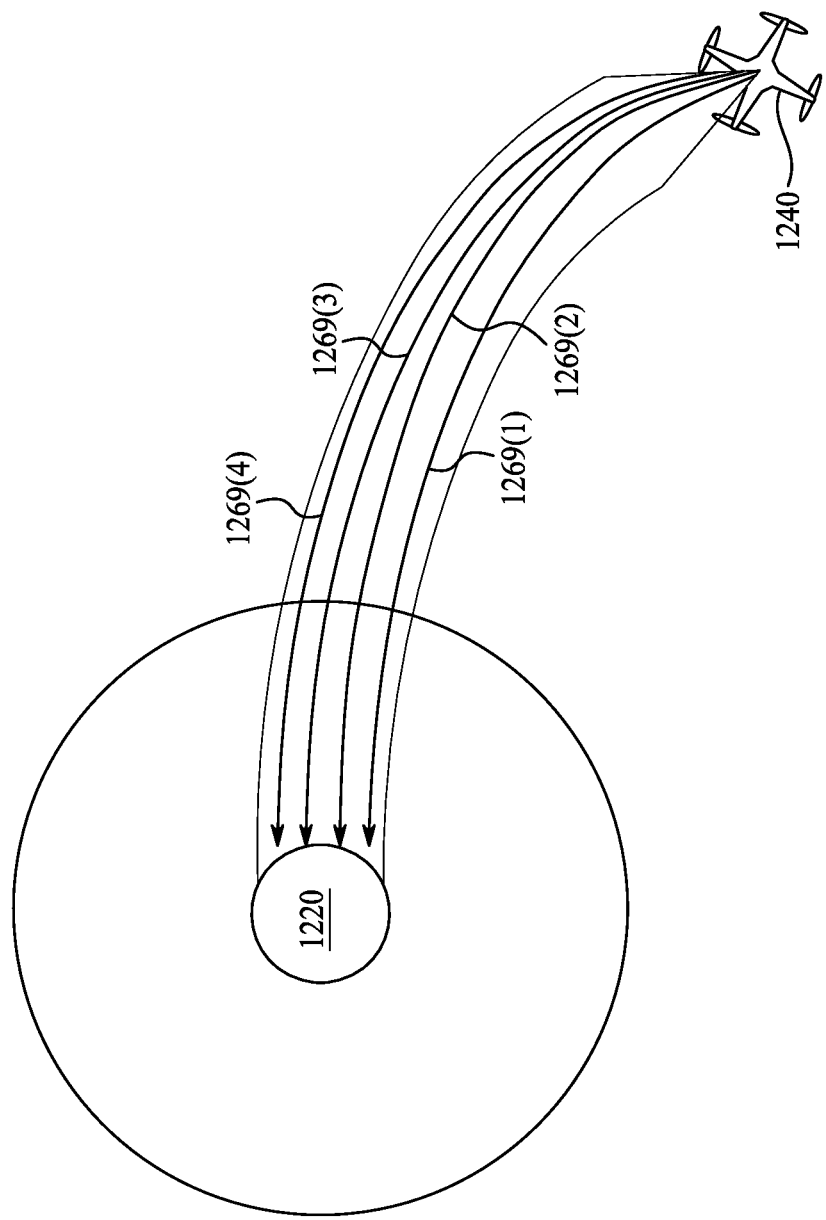
FIG. 12A illustrates examples of multiple trajectories an attacking UAV may traverse while approaching a protected site, according to certain embodiments.

FIG. 12A illustrates the multiple possible trajectories 1269(1), 1269(2), 1269(3), and 1269(4) (collectively "the possible trajectories 1269") UAV 1240 may take while approaching protected site 1220. The possible trajectories 1269 may be predicted, using a machine learning algorithms including a regression algorithm executing on circuitry included at the BS-CC included in protected site 1220 (e.g., BS-CC 130 in control center 132). To predict the possible trajectories 1269 that UAV 1240 may traverse while approaching protected site 1220, the regression algorithm may use the propagation delay of acoustic signals emitted from UAV 1240, an angle(s) of arrival of UAV 1240, a speed profile(s) of UAV 1240, and/or a combination thereof. The DAAADS collects as much intelligence on the approaching attacking UAV's trajectory as can be obtained, then predicts the rest of the waypoints on the trajectory using high performance computers based on machine learning algorithms including regression.

Figure 12B:
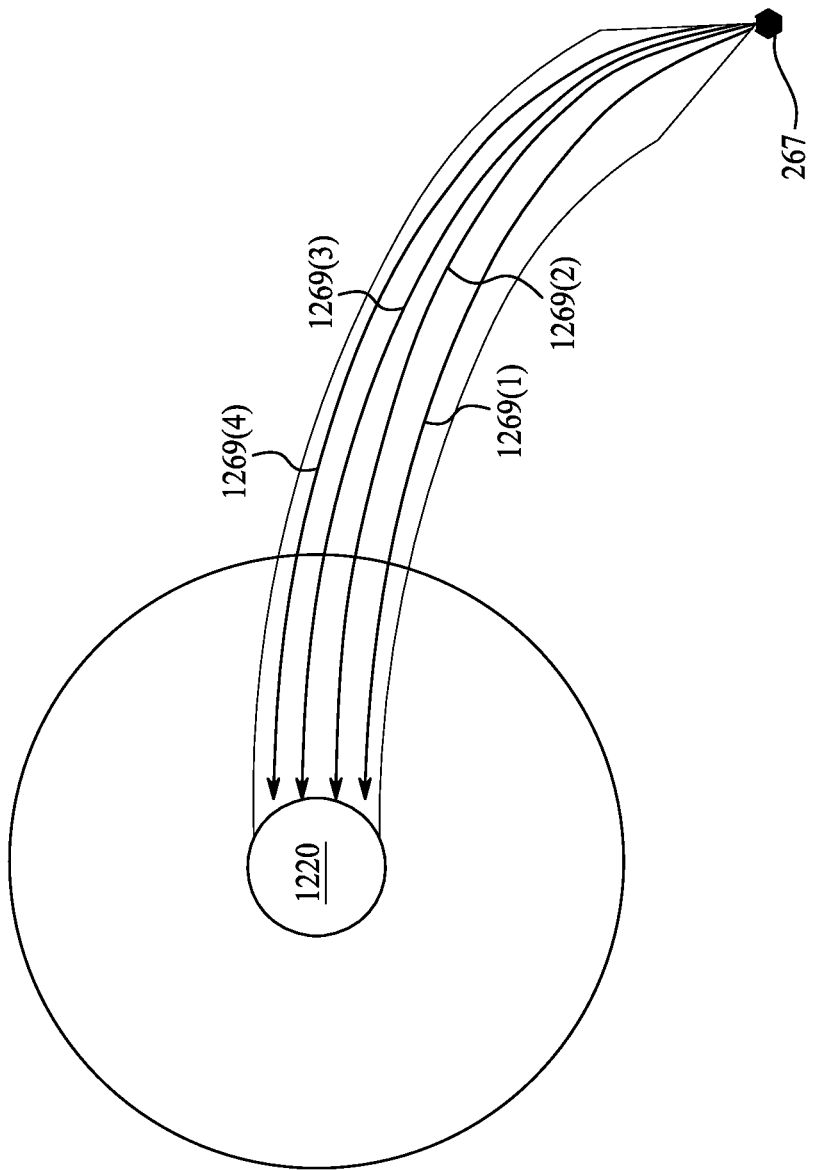
FIG. 12B illustrates examples of multiple trajectories that a particle of debris from a neutralized UAV may traverse while approaching a protected site, according to certain embodiments.

Similarly, FIG. 12B illustrates the multiple possible trajectories 1269(1), 1269(2), 1269(3), and 1269(4) (collectively "the possible trajectories 1269") debris 267 may take while approaching protected site 1220. The possible trajectories 1269 may be predicted, using a machine learning algorithm including regression executing on circuitry included at the BS-CC included in protected site 1210. To predict the possible trajectories 1269 a particle of debris may traverse while approaching protected site 1220, the regression algorithm may use the propagation delay of acoustic signals emitted from debris 267, an angle(s) of arrival of debris 267, a speed profile(s) of debris 267, and/or a combination thereof. The DAAADS collects as much intelligence on the approaching trajectory of the debris 267, then predicts the rest of the waypoints on the trajectory using high performance computers based on machine learning algorithms using regression.

FIGS. 13A-13E depict UAV multiple processes/groupings the ADAs surrounding a protected site may employ to detect an approaching flying object 1344 (attacking UAV or debris). Each of FIGS. 13A-13E illustrates a portion of protected site 1320 protected by six ADAs: 1310(1), 1310 (2), 1310(3), 1310(3), 1310(4), 1310(5), and 1310(6) (collectively "the ADAs 1310"). Also depicted in each of the FIGS. 13A-13E is a flying object 1344 (UAV 240, FIG. 2A or debris 267, FIG. 2B) following a trajectory 1369 while approaching ADAs 1310.

Figure 13C:
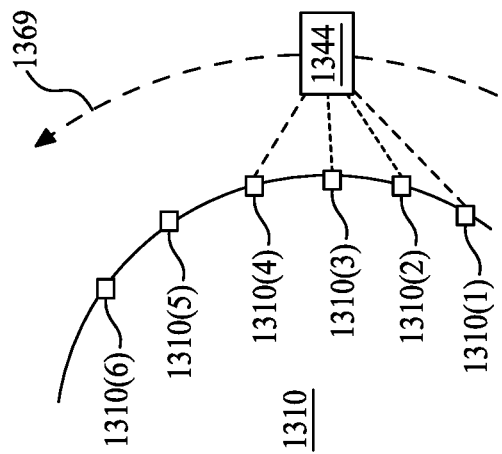
FIGS. 13A-13E each illustrate multiple ways in which groups of airborne defense agents may detect a flying object approaching a protected site, according to certain embodiments.
Figure 13B:
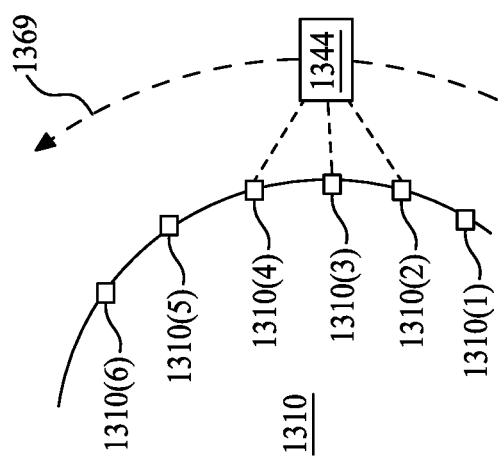
Figure 13A:
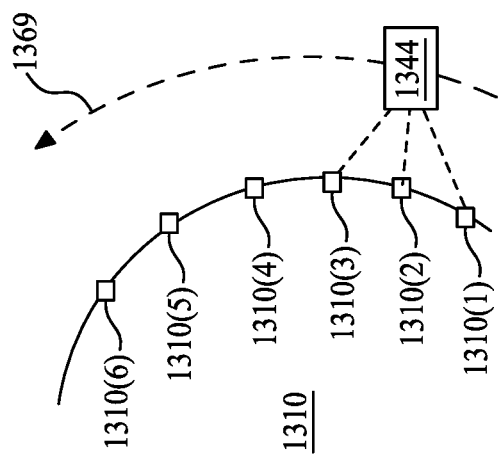

FIGS. 13A and 13B depict flying object 1344 being tracked along flight path 1369 by a single group of three of the ADAs 1310 at a time. Initially, as depicted in FIG. 13A, the flying object 1344 is detected by the group including ADAs 1310(1), 1310(2), and 1310(3). As the flying object 1344 progresses along flight path 1369, artificial intelligence executing on a BS-CC (not shown, however the BS-CC included in 1310 may be substantially similar/identical to BS-CC 130 in control center 132) transmits a signal to ADA 1310(1) indicating ADA 1310(1) is no longer to detect flying object 1344. Simultaneously, the BS-CC transmits a signal to ADA 1310(4) to begin detecting flying object 1344 along with ADAs 1310(2) and 1310(3). FIG. 13B depicts flying object 1344 being detected by ADAs 1310(2), 1310(3), and 1310(4) after the artificial intelligence executing on the BS-CC included in protected site 1310 indicates a handoff between ADA 1310(1) and 1310(4) is to be made.

Alternatively, as depicted in FIG. 13C, flying object 1344 may be detected at the same point along flight path 1369 by two overlapping groups of three ADAs at the same time. The first group of three ADAs detecting flying object 1344 in FIG. 13C includes ADAs 1310(1), 1310(2), and 1310(3) while the second group of three ADAs detecting flying object 1344 includes 1310(2), 1310(3), and 1310(4). As noted above, if processing overhead permits, the BS-CC can instruct all four ADAs (i.e., 1310(1), 1310(2), 1310(3), and 1310(4)) to detect flying object 1344 simultaneously to increase the precision of the measurements in some embodiments.

As flying object 1344 continues to progress along flight path 1369, the computing device may determine it is more beneficial to have two distinct groups of three ADAs detecting flying object 1344 rather than two overlapping groups of three ADAs. FIG. 13D illustrates two distinct groups of three ADAs detecting flying object 1344 traversing flight path 1369. The first distinct group of ADAs detecting flying object 1344 includes ADAs 1310(1), 1310(2), and 1310(3), while the second distinct group includes ADAs 1310(4), 1310(5), and 1310(6).

Figure 13E:
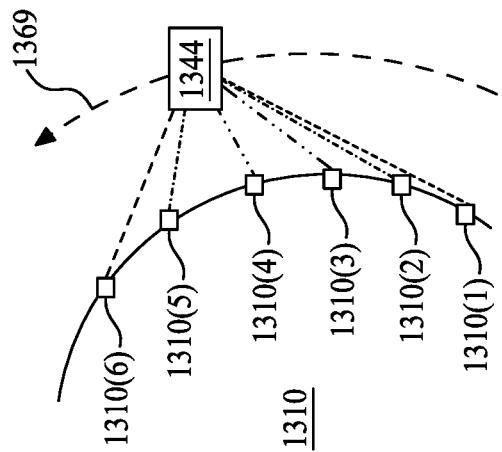
Figure 13D:
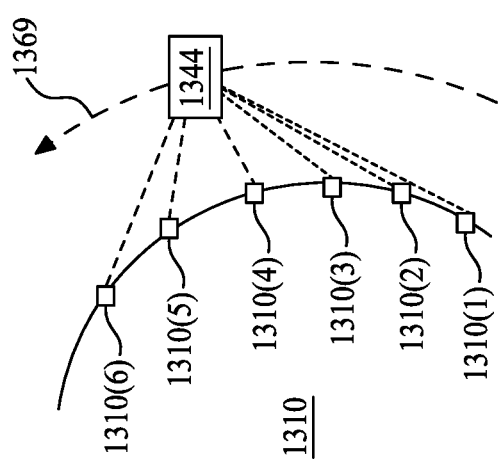

FIG. 13E depicts a scenario in which the computing device determines it is most beneficial for flying object 1344 to be detected by as many groups of three ADAs surrounding protected 1310 as possible. As illustrated in FIG. 13E, four groups of three ADAs are detecting flying object 1344 along flight path 1369 simultaneously. The four groups of three ADAs detecting flying object 1344 include a first group including ADAs 1310(1), 1310(2), and 1310(3); a second group comprising ADAs 1310(2), 1310(3), and 1310(4); a third group including ADAs 1310(3), 1310(4), and 1310(5); and a fourth group including ADAs 1310(4), 1310(5), and 1310(6). The number of groups of three ADAs able to detect UAV 1330 simultaneously may depend on the distance of flying object 1344 from the ADAs 1310, the strength of acoustic signal(s) emitted from flying object 1344, the frequency with which each ADA detects signals (i.e. localization frequency), and/or the sensitivity of the microphone array or other circuitry for sensing acoustic signals included in any one of the ADAs. As noted previously, according to certain embodiments all of the ADAs may be used simultaneously to detect any flying object 1344, which provides maximum precision in the localization calculations.

An advantage of the aerial acoustic sensing of the DAAADS system include the ability to sense a low flying UAV, which may be obstructed from the view of a conventional ground based radar sensor or a ground based acoustic sensor. A further advantage is that, for a given acoustic sensing sensitivity, an airborne sensor can sense farther than a ground based acoustic sensor, as the airborne perspective improves the sensing for acoustic waves propagating in the air. The gain in range is due to the geometry between the ADA and the attacking UAV and the ability to position the directional array. In addition, media homogeneity of the air also contributes to harnessing most of the acoustic signals emitting from the source. FIG. 2D shows the geometry for sensing the relative positions for a ground based acoustic sensor and the attacking UAV 240. In aspects of the present disclosure, when the attacking UAV 240 is a distance a meters from a ground level sensor, and a distance b meters above the ground, the maximum sensing range is achieved only at an elevation angle of 45 degrees where b is equal to a, therefore the maximum sensing range is calculated as ($\sqrt{2}a$).

FIG. 2E shows the airborne acoustic sensing by ADA 210 of the present disclosure. As the directional array is at the same horizontal level as the attacking UAV 240, the full, unobstructed sensing range can be used to detect the attacking UAV 240 at the sensing range of ($\sqrt{2}a$) as the angle is always 45 degrees regardless of the actual distance between the attacking UAV and the ADA 240, which results in about a 40% improvement compared to the ground acoustic sensing.

A first embodiment of the present disclosure is illustrated as shown in FIGS. 1-13. The first embodiment describes a distributed airborne acoustic anti-drone intelligence system (DAAADS) 100 for detecting trajectories of unmanned aerial vehicles (UAV) (140(1), 140(2), 140(3)) approaching a protected site 120, comprising a plurality of airborne defense agents (ADAs) (110(1)-110($n$)), wherein each ADA is located at a fixed radius from the protected site and equidistant from each other ADA, wherein each ADA equipped with a directional microphone array 311 configured to detect acoustic signals emitted by a unmanned aerial vehicle (UAV) approaching the protected site; a first computing device including a first computer-readable medium comprising first program instructions, executable by a first processing circuitry, to cause the first processing circuitry to determine an angle of approach and a distance of approaching UAV from the ADA; a GPS receiver 314 configured to locate the ADA in three-dimensional space; a first transceiver; a fixed tower 333 of height H, the fixed tower located at a fixed radius from the protected site and equidistant from each other tower; a tether 331, each tether of length L, wherein a top portion of the fixed tower is connected to a first end of the tether; an air balloon having a lower mount attached to a second end of the tether, wherein each air balloon is configured to hold the first computing device and the directional microphone array of the ADA at a fixed height L+H above the ground and is further configured to hover at a position above the fixed tower; a base station 130 configured with a wideband communications link to communicate with the first transceiver of each ADA, the protected site and an air defense unit; a control center (BS-CC) 132 located within the base station and configured with a second computing device 136 including a second computer-readable medium comprising program instructions, executable by second processing circuitry, to cause the second processing circuitry to calculate the speed of each of the approaching UAVs, aggregate the angles of approach, the distances and the speeds of the each of the approaching UAVs, predict trajectories of each of the approaching UAVs towards the protected site, identify each UAV having a trajectory predicted to intersect the protected site, alert the protected site of the predicted trajectories of each UAV having a trajectory predicted to intersect the protected site, transmit the predicted trajectories to the air defense unit 280 with a command to neutralize each attacking UAV, transmit a command to the plurality of ADAs to track particles of debris 267 generated by neutralizing the attacking UAV, receive distances and angles of approach of each particle of debris, calculate the speed of each particle of debris, estimate trajectories of each of the particles of debris, predict whether at least one trajectory of the particles of debris will intersect the protected site; and transmit an alert to the protected site that the at least one trajectory of the particles of debris is predicted to intersect the protected site. The BS-CC 132 is also configured to identify the type of approaching UAV, such as military drone, hobby drone, gas powered drone, electric powered drone, and the like.

Each ADA 110(1)-110(n) further comprises a motor 318, a propeller 319 and navigation circuitry 316 configured to cause the ADA to hover at a fixed height from the ground, at a fixed radius from the protected site 120 and equidistant from each other ADA 110(1)-110(n).

The control center (BS-CC) 132 is configured to transmit position signals to the navigation circuitry 316 of each ADA 110(1)-110(n) to control its speed and position.

The second computer-readable medium comprises a machine learning processor including a regression algorithm to predict the trajectories of each of the particles of debris which intersect the protected site, wherein the regression algorithm is configured to predict trajectories of each of particles of debris within a confidence interval.

The second computer-readable medium further comprises program instructions including one of a deep learning algorithm and reinforcement learning algorithm to identify a threat level of each particle of debris predicted to intersect the protected site, wherein the regression algorithm is configured to predict each of the trajectories of the UAVs within a confidence interval.

Additionally, the second computer-readable medium comprises a machine learning processor including a regression algorithm to predict each of the trajectories of the UAVs which intersect the protected site.

The second computer-readable medium further comprises program instructions including one of a deep learning algorithm and reinforcement learning algorithm to identify a type of each UAV having a trajectory predicted to intersect the protected site.

The first computing device of each ADA includes switching circuitry configured to switch the power of each directional microphone of the directional microphone array ON and OFF in an alternating sequence. The second processing circuitry is configured to transmit control signals to the ADAs to switch the directional microphone arrays ON and OFF simultaneously.

The first processing circuitry 313 of each ADA is configured to convert the acoustic signals from a time domain to a frequency domain, identify a set of frequency components and estimate the distance from a sound source to the directional microphone array of each ADA, wherein the sound source is one of an attacking UAV and a particle of debris from a neutralized attacking UAV.

In the system, each directional microphone of the directional microphone array 311 is oriented to receive acoustic signals from a different angle. Each first computing device 313 includes first circuitry configured to measure an amplitude, A, of each acoustic signal during the alternating ON periods. Further, each first processing circuitry 313 is configurable to detect an angle of arrival, ω, of the acoustic signal from the angle of the directional microphone receiving the greatest amplitude, and to estimate the distance between each ADA and an approaching sound source by measuring a propagation delay, τ, of the acoustic signal having the greatest amplitude, wherein the approaching sound source is one of an attacking UAV and a particle of debris from a neutralized attacking UAV.

The second processing circuitry 136 is configurable to predict the trajectory of an approaching UAV (e.g., 140(1)) by triangulating the acoustic signals received by the directional microphone arrays 311 of three equidistant ADAs (e.g., 110(1), 110(2), and 110(3)).

The second processing circuitry further comprises a machine learning processor configured to predict the trajectory of each approaching UAV. Second processing circuitry 136 is further configurable to estimate the speed of the approaching UAV 140(1) by subtracting the distances estimated by each of three equidistant ADAs 110(1), 110(2), and 110(3) at a first ON period (e.g., ON[1]) from the distances estimated at a second ON period (e.g., ON[2]) and dividing the difference by the time between the first ON period and the second ON period.

A second embodiment of the present disclosure depicted in FIGS. 1-13 is directed to a method 400 for detecting trajectories of unmanned aerial vehicles (e.g., UAVs 140(1), 140(2), and 140(3)) approaching a protected site 120 by a plurality of airborne defense agents (ADAs 110(1)-110(n)). The method comprises, at step 410, switching each directional microphone of a directional microphone array 311 of a plurality of airborne defense agents (ADAs) 110(1), 110 (2), ... 110(n), (collectively referred to as ADAs 10) ON and OFF during consecutive time periods in which only one directional microphone is ON in a time period, wherein each ADA is located at a fixed radius from the protected site and equidistant from each other ADA, wherein each ADA is located on an air balloon held by a tether 331 to a fixed tower 333; detecting acoustic signals generated by each UAV approaching the protected site during consecutive ON periods; estimating, by a first computing device of at least one of the ADAs, an angle of approach and a distance of each UAV approaching the protected site from the at least one ADA during the first time period of the consecutive time periods, wherein the first computing device includes a first computer-readable medium having first program instructions, that, when executed by the first processing circuitry, cause the first processing circuitry to estimate the angle of approach and the distance of each approaching UAV from the at least one ADA; estimating the angle of approach and the distance of each approaching UAV from the at least one ADA during a second time period of the consecutive time periods; transmitting the estimated angles of approach and the estimated distances from each ADA to a base station; estimating, by a second computing device including a second computer-readable medium comprising program instructions, executable by a second processing circuitry located in a control center 132 of the base station 130, a speed of each UAV by subtracting the distance estimated during a first ON time period from the distance estimated during a second ON time period for each of three equidistant ADAs and dividing by the difference between the first and second time periods; aggregating, by the second computing device, the angles of approach, distances and speeds of the approaching UAVs; predicting, by the second computing device, trajectories of each approaching UAV; transmitting, by the base station, an alarm to an air defense unit 280 when at least one of the trajectories of at least one approaching UAV is predicted to intersect with the protected site; neutralizing, by the air defense unit, the approaching UAV which has a trajectory which intersects with the protected site, thus generating particles of debris 267; tracking, by the directional microphone of at least one ADA, the angle of approach and the distance of each of the particles of debris; transmitting the angle of approach and the distance of each of the particles of debris to the control center; estimating, by the control center, the speed of each of the particles of debris, estimating, by the control center, trajectories of each of the particles of debris; predicting, by the control center, whether at least one trajectory of the particles of debris will intersect the protected site; and transmitting an alert to the protected site that the at least one trajectory of the particles of debris is predicted to intersect the protected site.

The method includes estimating trajectories of each of the particles of debris by a regression algorithm contained in a machine learning processor of the second computer-readable medium, wherein the regression algorithm is configured to predict the trajectories of each of the particles of debris from neutralized UAVs within a confidence interval.

The method further includes identifying, by one of a deep learning algorithm and reinforcement learning algorithm contained in a machine learning processor of the second computer-readable medium, a threat level of each of the particles of debris predicted to intersect the protected site; and transmitting the threat level in the alert to the protected site.

A third embodiment of the present disclosure depicted in FIGS. 1-13 is directed to a non-transitory computer readable medium having program instructions stored therein that, when executed by one or more processors, cause the one or more processors to perform a method for detecting trajectories of unmanned aerial vehicles (UAV) approaching a protected site is describes, comprising receiving an angle of approach and distance of each unmanned aerial vehicle (UAV) approaching the protected site, wherein each angle of approach and distance was estimated by a plurality of airborne defense agents (ADAs) surrounding the protected site, wherein each ADA is located at a fixed radius from the protected site and equidistant from each other ADA, wherein each ADA is located on an air balloon held by a tether to a fixed tower, and is configured to detect acoustic signals generated by each UAV approaching the protected site during consecutive ON periods; estimating a speed of each UAV by subtracting the distance estimated by a directional microphone array of each ADA of three equidistant ADAs during a first ON time period from the distance estimated during a second ON time period and dividing by the difference between the first and second time periods; aggregating the angles of approach, distances and speeds of each of the approaching UAVs; predicting trajectories of each UAV towards the protected site; transmitting an alarm to an air defense unit when at least one of the trajectories of at least one UAV is predicted to intersect with the protected site; neutralizing, by the air defense unit, the UAV which has a trajectory which intersects with the protected site, thus generating particles of debris; detecting, by at least one of the ADAs, acoustic signals generated by the particles of debris; calculating an angle of approach, a distance and a speed of each of the particles of debris; estimating trajectories of each of the particles of debris; predicting whether at least one trajectory of the particles of debris will intersect the protected site; and transmitting an alert to the protected site that a trajectory of a particle of debris is predicted to intersect the protected site.

The method executed by the non-transitory computer readable medium method further comprises estimating the trajectories of the particles of debris by a regression algorithm contained in a machine learning processor; and predicting the trajectories of the particles of debris within a confidence interval.

The non-transitory computer readable medium method comprises identifying, by one of a deep learning algorithm and reinforcement learning algorithm contained in a machine learning processor, a threat level of each particle of debris predicted to intersect the protected site; and transmitting the threat level in the alert to the protected site.

Figure 14:
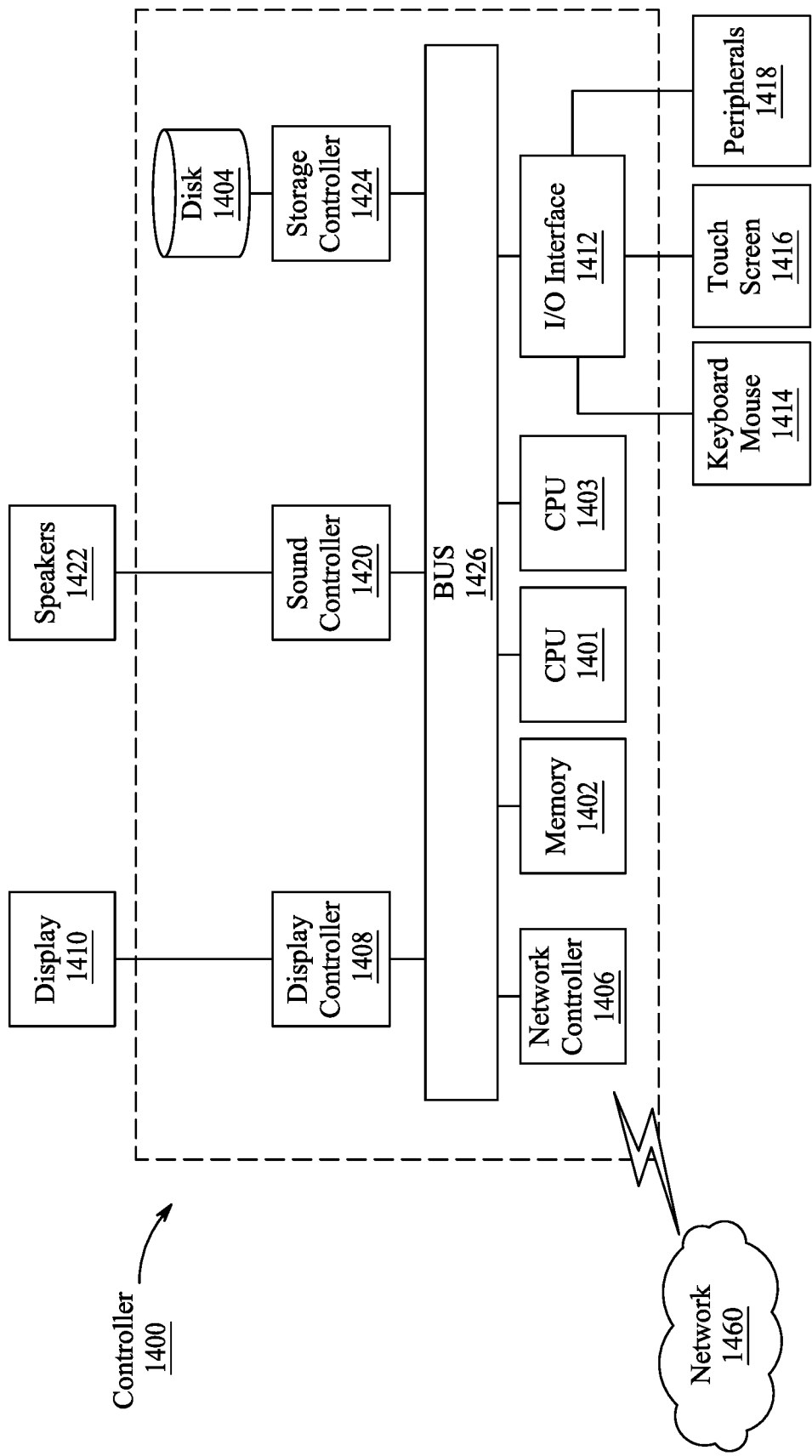
FIG. 14 is an illustration of a non-limiting example of details of computing hardware used in the computing device, according to certain embodiments.

Next, further details of the hardware description of the computing environment of the base station 130 according to exemplary embodiments are described with reference to FIG. 14. In FIG. 14, a controller 1400 is described is representative of the second computing device 136 of FIG. 1 in which the controller includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401, 1403 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w CD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
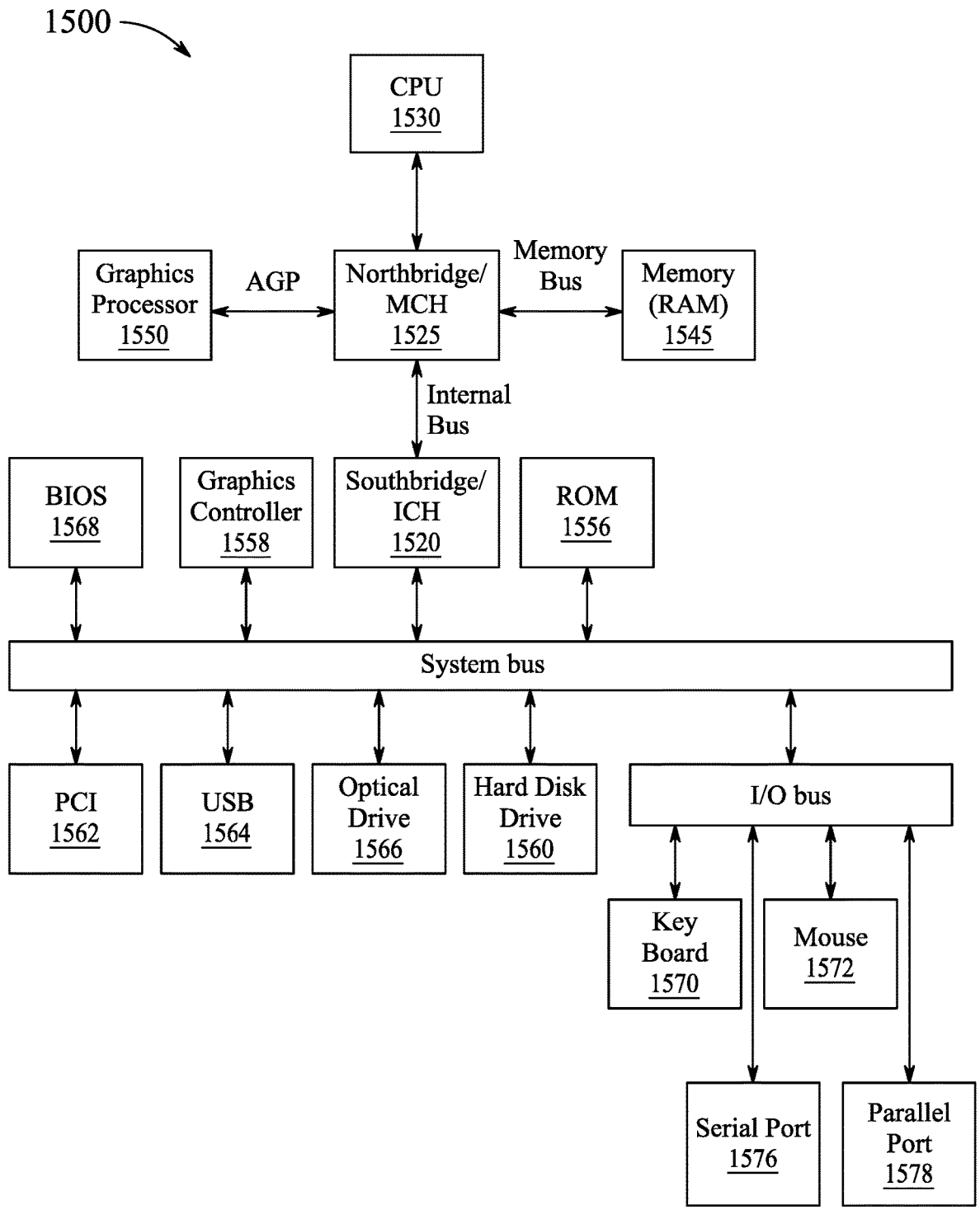
FIG. 15 is an exemplary schematic diagram of a data processing system used within the computing device, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
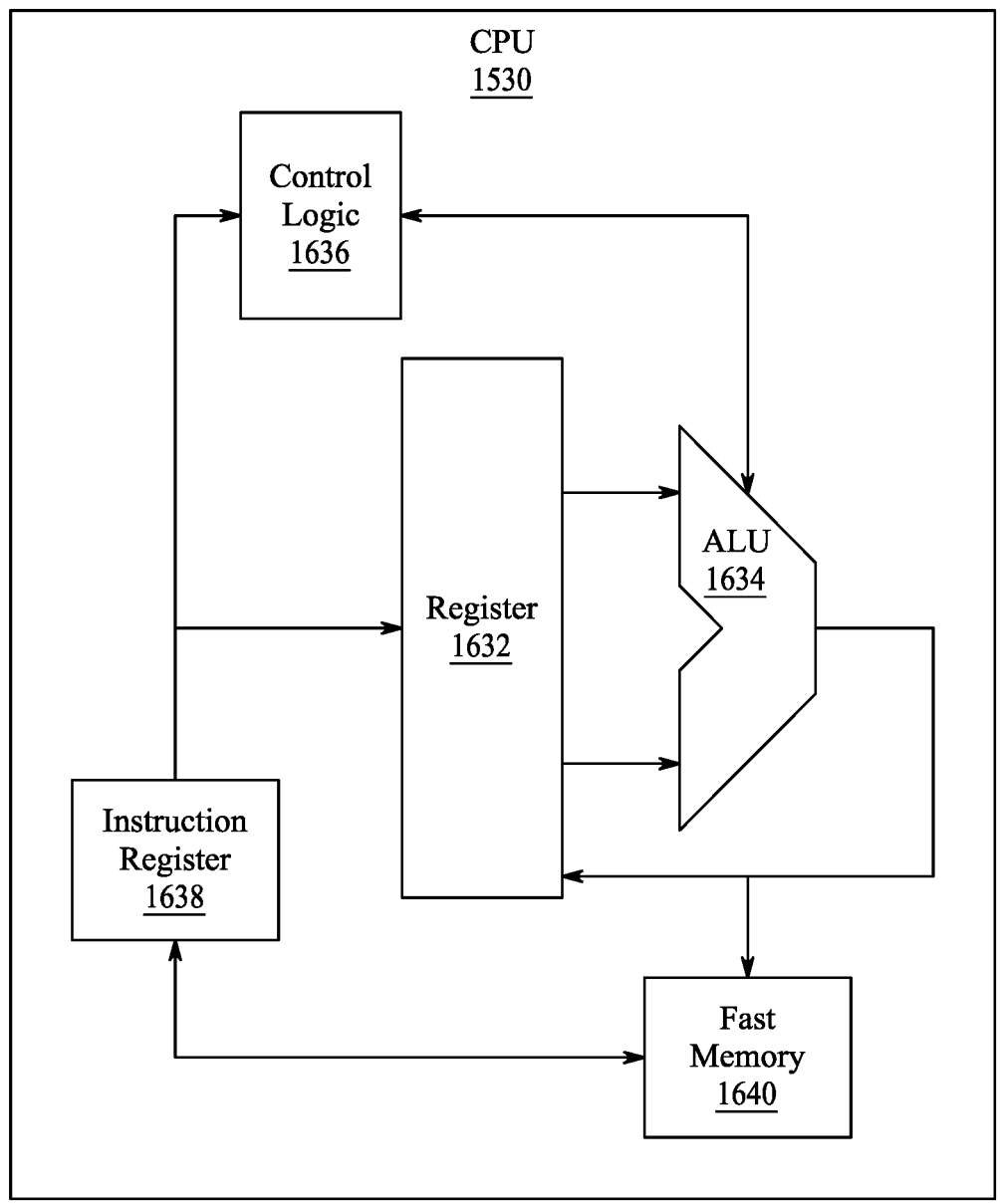
FIG. 16 is an exemplary schematic diagram of a processor used with the computing device, according to certain embodiments.

For example, FIG. 16 shows one implementation of CPU 1530. In one implementation, the instruction register 1638 retrieves instructions from the fast memory 1640. At least part of these instructions are fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562.

The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA , an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 17:
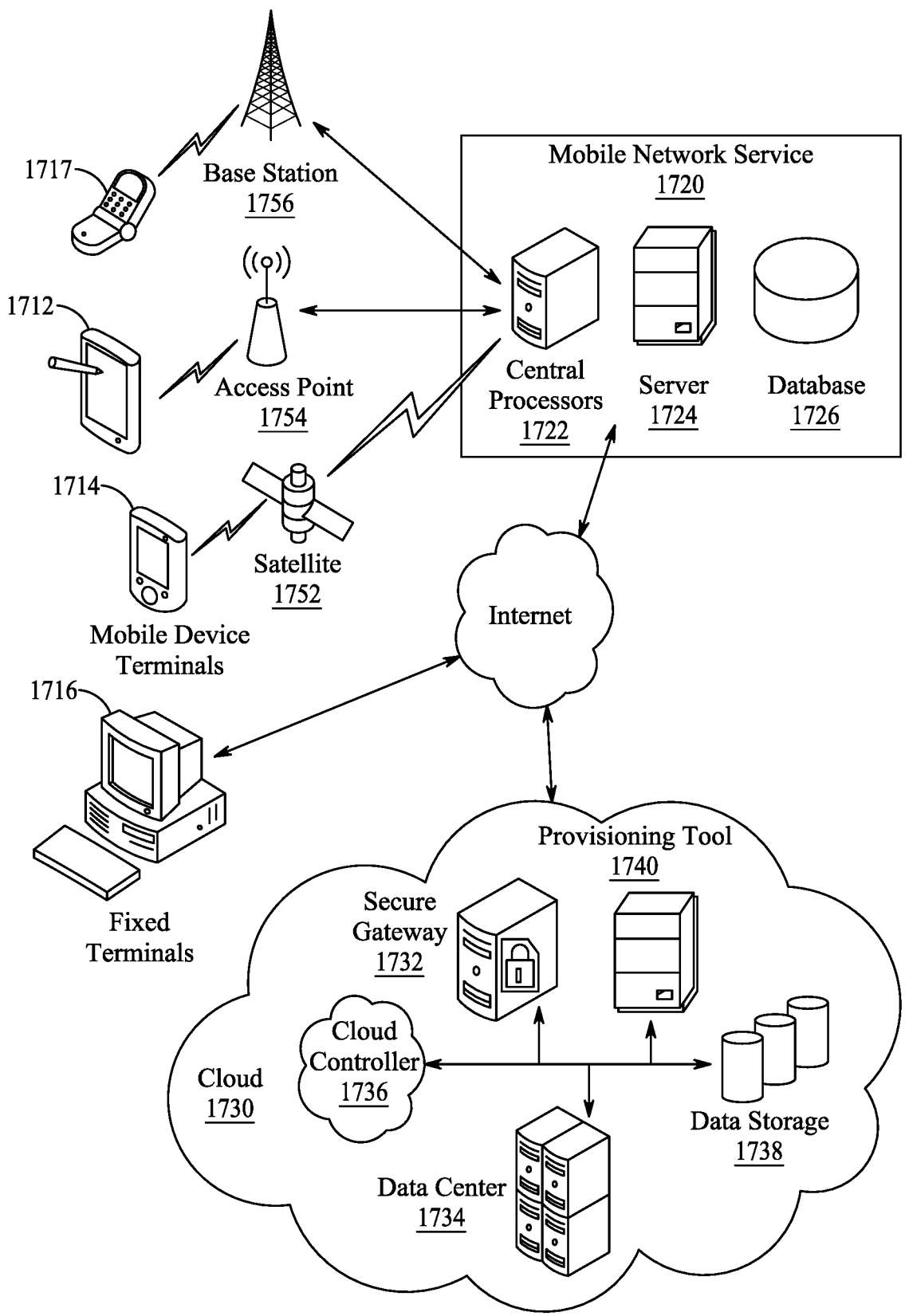
FIG. 17 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A distributed airborne acoustic anti-drone intelligence system, comprising:
    a plurality of airborne defense agents (ADAs), wherein each ADA is located at a fixed radius from a protected site and equidistant from each other ADA, wherein each ADA is equipped with:
        a directional microphone array configured to detect acoustic signals emitted by a unmanned aerial vehicle (UAV) approaching the protected site;
        a first computing device including a first computer-readable medium comprising first program instructions, executable by a first processing circuitry, to cause the first processing circuitry to determine an angle of approach and a distance of approaching UAV from the ADA;
        a GPS receiver configured to locate the ADA in three-dimensional space;
        a first transceiver;
        a fixed tower of height H, the fixed tower located at a fixed radius from the protected site and equidistant from each other tower;
        a tether, each tether of length L, wherein a top portion of the fixed tower is connected to a first end of the tether;
        an air balloon having a lower mount attached to a second end of the tether, wherein each air balloon is configured to hold the first computing device and the directional microphone array of the ADA at a fixed height L+H above the ground and is further configured to hover at a position above the fixed tower;
    a base station configured with a wideband communications link to communicate with the first transceiver of each ADA, the protected site and an air defense unit;
    a control center (BS-CC) located within the base station and configured with a second computing device including a second computer-readable medium comprising program instructions, executable by second processing circuitry, to cause the second processing circuitry to:
        calculate a speed of each of the approaching UAVs,
        aggregate the angles of approach, the distances and the speeds of the each of the approaching UAVs,
        predict trajectories of each of the approaching UAVs towards the protected site,
        identify each UAV having a trajectory predicted to intersect the protected site,
        alert the protected site of the predicted trajectories of each UAV having a trajectory predicted to intersect the protected site,
        transmit the predicted trajectories to the air defense unit with a command to neutralize each UAV predicted to intersect the protected site,
        transmit a command to the plurality of ADAs to track particles of debris generated by neutralizing the UAV predicted to intersect the protected site,
        receive distances and angles of approach of each particle of debris,
        calculate a speed of each particle of debris,
        estimate trajectories of each of the particles of debris,
        predict whether at least one trajectory of the particles of debris will intersect the protected site; and
        transmit an alert to the protected site that the at least one trajectory of the particles of debris is predicted to intersect the protected site.

2. The system of claim 1, wherein the second computer-readable medium comprises a machine learning processor including a regression algorithm to predict the trajectories of each of the particles of debris which intersect the protected site.

3. The system of claim 2, wherein the regression algorithm is configured to predict trajectories of each of particles of debris within a confidence interval.

4. The system of claim 3, wherein the second computer-readable medium further comprises program instructions including one of a deep learning algorithm and reinforcement learning algorithm to identify a threat level of each particle of debris predicted to intersect the protected site.

5. The system of claim 1, wherein the second computer-readable medium comprises a machine learning processor including a regression algorithm to predict each of the trajectories of the UAVs which intersect the protected site.

6. The system of claim 4, wherein the regression algorithm is configured to predict each of the trajectories of the UAVs within a confidence interval.

7. The system of claim 6, wherein the second computer-readable medium further comprises program instructions including one of a deep learning algorithm and reinforcement learning algorithm to identify a type of each UAV having a trajectory predicted to intersect the protected site.

8. The system of claim 1, further comprising:
    wherein the first computing device includes switching circuitry configured to switch the power of each directional microphone of the directional microphone array ON and OFF in an alternating sequence; and
    wherein the second processing circuitry is configured to transmit control signals to the ADAs to switch the directional microphone arrays ON and OFF simultaneously.

9. The system of claim 8, wherein the first processing circuitry is configured to convert the acoustic signals from a time domain to a frequency domain, identify a set of frequency components and estimate the distance from a sound source to the directional microphone array of each ADA.

10. The system of claim 9, wherein the sound source is one of an attacking UAV and a particle of debris from a neutralized attacking UAV.

11. The system of claim 8, further comprising:
    wherein each directional microphone of the directional microphone array is oriented to receive acoustic signals from a different angle;
    wherein each first computing device includes first circuitry configured to measure an. amplitude, A, of each acoustic signal during the alternating ON periods;
    wherein each first processing circuitry is configured to:
    detect an angle of arrival, $\omega$, of the acoustic signal from the angle of the directional microphone receiving the greatest amplitude; and
    estimate the distance between each ADA and an approaching sound source by measuring a propagation delay, $\tau$, of the acoustic signal having the greatest amplitude, wherein the approaching sound source is one of an attacking UAV and a particle of debris from a neutralized attacking UAV.

12. The system of claim 11, wherein the second processing circuitry is further configured to predict the trajectories of an approaching sound source by triangulating the acoustic signals received by the directional microphone arrays of three equidistant ADAs.

13. The system of claim 12, further comprising:
    wherein the second processing circuitry is further configured to estimate the speed of the approaching sound source by subtracting the distances estimated by each of three equidistant ADAs at a first ON period from the distances estimated at a second ON period and dividing the difference by the time between the first ON period and the second ON period.

14. A method for detecting trajectories of unmanned aerial vehicles (UAV) approaching a protected site, comprising:
switching each directional microphone of a directional microphone array of a plurality of airborne defense agents (ADAs) ON and OFF during consecutive time periods in which only one directional microphone is ON in a time period, wherein each ADA is located at a fixed radius from the protected site and equidistant from each other ADA, wherein each ADA is located on an air balloon held by a tether to a fixed tower;
detecting acoustic signals generated by each UAV approaching the protected site during consecutive ON periods;
estimating, by a first computing device of at least one of the ADAs, an angle of approach and a distance of each UAV approaching the protected site from the at least one ADA during the first time period of the consecutive time periods, wherein the first computing device includes a first computer-readable medium having first program instructions, that, when executed by the first processing circuitry, cause the first processing circuitry to estimate the angle of approach and the distance of each approaching UAV from the at least one ADA;
estimating the angle of approach and the distance of each approaching UAV from the at least one ADA during a second time period of the consecutive time periods;
transmitting the estimated angles of approach and the estimated distances from each ADA to a base station;
estimating, by a second computing device including a second computer-readable medium comprising program instructions, executable by a second processing circuitry located in a control center of the base station, a speed of each UAV by subtracting the distance estimated during a first ON time period from the distance estimated during a second ON time period for each of three equidistant ADAs and dividing by the difference between the first and second time periods;
aggregating, by the second computing device, the angles of approach, distances and speeds of the approaching UAVs;
predicting, by the second computing device, trajectories of each approaching UAV;
transmitting, by the base station, an alarm to an air defense unit when at least one of the trajectories of at least one approaching UAV is predicted to intersect with the protected site;
neutralizing, by the air defense unit, the approaching UAV which has a trajectory which intersects with the protected site, thus generating particles of debris;
tracking, by the directional microphone of at least one ADA, the angle of approach and the distance of each of the particles of debris;
transmitting the angle of approach and the distance of each of the particles of debris to the control center;
estimating, by the control center, the speed of each of the particles of debris,
estimating, by the control center, trajectories of each of the particles of debris;
predicting, by the control center, whether at least one trajectory of the particles of debris will intersect the protected site; and
transmitting an alert to the protected site that the at least one trajectory of the particles of debris is predicted to intersect the protected site.

15. The method of claim 14, further comprising:
estimating trajectories of each of the particles of debris by a regression algorithm contained in a machine learning processor of the second computer-readable medium.

16. The method of claim 15, wherein the regression algorithm is configured to predict the trajectories of each of the particles of debris from neutralized UAVs within a confidence interval.

17. The method of claim 16, further comprising:
identifying, by one of a deep learning algorithm and reinforcement learning algorithm contained in a machine learning processor of the second computer-readable medium, a threat level of each of the particles of debris predicted to intersect the protected site; and
transmitting the threat level in the alert to the protected site.

18. A non-transitory computer readable medium having program instructions stored therein that, when executed by one or more processors, cause the one or more processors to perform a method for detecting trajectories of unmanned aerial vehicles (UAV) approaching a protected site, comprising:
receiving an angle of approach and distance of each unmanned aerial vehicle (UAV) approaching the protected site, wherein each angle of approach and distance was estimated by a plurality of airborne defense agents (ADAs) surrounding the protected site, wherein each ADA is located at a fixed radius from the protected site and equidistant from each other ADA, wherein each ADA is located on an air balloon held by a tether to a fixed tower, and is configured to detect acoustic signals generated by each UAV approaching the protected site during consecutive ON periods;
estimating a speed of each UAV by subtracting the distance estimated by a directional microphone array of each ADA of three equidistant ADAs during a first ON time period from the distance estimated during a second ON time period and dividing by the difference between the first and second time periods;
aggregating the angles of approach, distances and speeds of each of the approaching UAVs;
predicting trajectories of each UAV towards the protected site;
transmitting an alarm to an air defense unit when at least one of the trajectories of at least one UAV is predicted to intersect with the protected site;
neutralizing, by the air defense unit, the UAV which has a trajectory which intersects with the protected site, thus generating particles of debris;
detecting, by at least one of the ADAs, acoustic signals generated by the particles of debris;
calculating an angle of approach, a distance and a speed of each of the particles of debris;
estimating trajectories of each of the particles of debris;
predicting whether at least one trajectory of the particles of debris will intersect the protected site; and
transmitting an alert to the protected site that a trajectory of a particle of debris is predicted to intersect the protected site.

19. The non-transitory computer readable medium method of claim 18, further comprising: estimating the trajectories of the particles of debris by a regression algorithm contained in a machine learning processor; and predicting the trajectories of the particles of debris within a confidence interval.

20. The non-transitory computer readable medium method of claim 19, further comprising:
   identifying, by one of a deep learning algorithm and reinforcement learning algorithm contained in a machine learning processor, a threat level of each particle of debris predicted to intersect the protected site; and
   transmitting the threat level in the alert to the protected site.

\* \* \* \* \*